(12) United States Patent
Yang et al.

(10) Patent No.: US 10,990,382 B2
(45) Date of Patent: Apr. 27, 2021

(54) ENCRYPTION MACHINE UPGRADE, DATA IMPORT AND REQUEST MIGRATION METHOD, APPARATUS AND DEVICE

(71) Applicant: Alibaba Group Holding Limited, Grand Cayman (KY)

(72) Inventors: Libei Yang, Hangzhou (CN); Long Lin, Hangzhou (CN); Xianwei Lin, Hangzhou (CN); Haitao Jiang, Hangzhou (CN); Jiandong Su, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 5 days.

(21) Appl. No.: 16/503,295

(22) Filed: Jul. 3, 2019

(65) Prior Publication Data

US 2020/0012491 A1  Jan. 9, 2020

(30) Foreign Application Priority Data

Jul. 5, 2018  (CN) .......................... 201810729817.0

(51) Int. Cl.
*G06F 9/44* (2018.01)
*G06F 8/656* (2018.01)
(Continued)

(52) U.S. Cl.
CPC .......... *G06F 8/656* (2018.02); *G06F 11/1461* (2013.01); *G06F 11/1466* (2013.01);
(Continued)

(58) Field of Classification Search
CPC .... G06F 8/656; G06F 11/146; G06F 11/1461; H04L 9/0877; H04L 67/1008
(Continued)

(56) References Cited

U.S. PATENT DOCUMENTS

| 5,910,988 A * | 6/1999 | Ballard ................ G06Q 20/389 |
| | | 705/75 |
| 6,606,744 B1 * | 8/2003 | Mikurak ................. H04L 29/06 |
| | | 717/174 |

(Continued)

FOREIGN PATENT DOCUMENTS

| CN | 107330337 A | 11/2017 |
| CN | 108881276 A | 11/2018 |

(Continued)

OTHER PUBLICATIONS

Pingale et al, "Design aspects for Upgrading Firmware of a Resource Constrained Device in the Field", IEEE, pp. 903-907 (Year: 2016).*

(Continued)

*Primary Examiner* — Anil Khatri
(74) *Attorney, Agent, or Firm* — Lee & Hayes, P.C.

(57) ABSTRACT

A method of upgrading encryption machine, including: a controller for managing upgrading of encryption machine determines a first encryption machine to be upgraded; the controller transfers the data of the first encryption machine to a second encryption machine; and the controller sends an upgrade command for instructing the first encryption machine to conduct the upgrade to the first encryption machine. The above method solves the problem that in the process of upgrading the encryption machine in the conventional techniques, the operation is extremely complicated, which is easy to cause an operation error and interruption of user service.

19 Claims, 14 Drawing Sheets

(51) Int. Cl.
*G06F 11/14* (2006.01)
*H04L 9/08* (2006.01)
*H04L 29/08* (2006.01)

(52) U.S. Cl.
CPC ........ *G06F 11/1469* (2013.01); *H04L 9/0877* (2013.01); *H04L 67/1008* (2013.01)

(58) Field of Classification Search
USPC .................................. 717/168–174; 709/203
See application file for complete search history.

(56) References Cited

U.S. PATENT DOCUMENTS

| | | | |
|---|---|---|---|
| 7,185,331 B2 * | 2/2007 | Talati ...................... | G06F 8/656 |
| | | | 717/168 |
| 8,418,168 B2 * | 4/2013 | Tyhurst ..................... | G06F 8/65 |
| | | | 717/173 |
| 8,428,649 B2 * | 4/2013 | Yan ...................... | H04B 1/3816 |
| | | | 455/558 |
| 8,505,003 B2 * | 8/2013 | Bowen .................... | H04L 67/02 |
| | | | 717/168 |
| 8,555,273 B1 * | 10/2013 | Chia ....................... | G06F 8/654 |
| | | | 717/173 |
| 8,612,773 B2 * | 12/2013 | Nataraj ................. | H04L 9/3234 |
| | | | 713/192 |
| 8,744,071 B2 * | 6/2014 | Leggette ............. | G06F 11/1012 |
| | | | 380/28 |
| 8,887,144 B1 * | 11/2014 | Marr ..................... | H04L 41/082 |
| | | | 717/168 |
| 8,935,691 B2 * | 1/2015 | Ben Ayed ................. | G06F 8/61 |
| | | | 717/178 |
| 9,021,452 B2 * | 4/2015 | Kripalani .................. | G06F 8/65 |
| | | | 717/135 |
| 9,052,939 B2 * | 6/2015 | Ferris ...................... | H04L 43/00 |
| 9,225,791 B2 | 12/2015 | Ferris | |
| 9,344,484 B2 | 5/2016 | Ferris | |
| 9,424,432 B2 | 8/2016 | Holland et al. | |
| 9,609,058 B2 | 3/2017 | Vallabhaneni et al. | |
| 9,733,849 B2 * | 8/2017 | O'Hare ................. | G06F 3/0619 |
| 9,792,112 B2 * | 10/2017 | Henry ................... | G06F 11/366 |
| 10,146,675 B1 * | 12/2018 | Shemer ..................... | G06F 8/71 |
| 10,325,107 B2 * | 6/2019 | Peddada ............. | G06F 21/6227 |
| 10,409,625 B1 * | 9/2019 | Suryanarayanan ..... | G06F 8/656 |
| 2012/0221845 A1 | 8/2012 | Ferris | |
| 2015/0022666 A1 | 1/2015 | Kay et al. | |
| 2018/0302495 A1 | 10/2018 | Lee et al. | |
| 2018/0343300 A1 | 11/2018 | Halter et al. | |

FOREIGN PATENT DOCUMENTS

| | | |
|---|---|---|
| WO | WO2018201991 A1 | 11/2018 |
| WO | WO2019109809 A1 | 6/2019 |

OTHER PUBLICATIONS

Morbitzer et al, "Extracting Secrets from Encrypted Virtual Machines", ACM, pp. 221-230 (Year: 2019).*
Somani et al, Implementing Digital Signature with RSA Encryption Algorithm to Enhance the Data Security of Cloud in Cloud Computing, IEEE, pp. 211-216 (Year: 2010).*
Ragaway, "Authenticated-Encryption with Associated-Data", ACM, pp. 98-107 (Year: 2002).*
Goyal et al, "Attribute-Based Encryption for Fine-Grained Access Control of Encrypted Data", ACM, pp. 89-98 (Year: 2006).*
Ghebghoub et al, "Security Model Based Encryption To Protect Data on Cloud", ACM, pp. 50-55 (Year: 2014).*
Vichare et al, "Data Security using Authenticated Encryption and Decryption Algorithm for Android Phones", IEEE, pp. 789-794 (Year: 2017).*
Lewis et al, "Backing Up Big Data Using Encryption Techniques", IEEE, pp. 1-2 (Year: 2018).*

* cited by examiner

300

```
┌─────────────────────────────────────────────────────┐
│  THE FIRST ENCRYPTION MACHINE RECEIVES THE FIRST    │
│  DATA BACKUP COMMAND FOR INSTRUCTING THE FIRST      │
│  ENCRYPTION MACHINE TO CONDUCT THE DATA BACKUP,     │
│  WHERE THE FIRST DATA BACKUP COMMAND IS SENT BY     │
│  THE CONTROLLER FOR MANAGING UPGRADING OF           │
│  ENCRYPTION MACHINE                                 │
│                      S301                           │
└─────────────────────────────────────────────────────┘
                          │
                          ▼
┌─────────────────────────────────────────────────────┐
│  THE FIRST ENCRYPTION MACHINE RETURNS THE           │
│  EXPORTED FIRST DATA TO THE CONTROLLER              │
│                      S302                           │
└─────────────────────────────────────────────────────┘
                          │
                          ▼
┌─────────────────────────────────────────────────────┐
│  THE FIRST ENCRYPTION MACHINE RECEIVES THE UPGRADE  │
│  COMMAND FOR INSTRUCTING THE FIRST ENCRYPTION       │
│  MACHINE TO CONDUCT THE UPGRADE, WHERE THE UPGRADE  │
│  COMMAND IS SENT BY THE CONTROLLER FOR MANAGING     │
│  UPGRADING OF ENCRYPTION MACHINE                    │
│                      S303                           │
└─────────────────────────────────────────────────────┘
                          │
                          ▼
┌─────────────────────────────────────────────────────┐
│  THE FIRST ENCRYPTION MACHINE PERFORMS THE UPGRADE  │
│  OPERATION ACCORDING TO THE UPGRADE COMMAND         │
│                      S304                           │
└─────────────────────────────────────────────────────┘
```

THE SECOND ENCRYPTION MACHINE RECEIVES THE FIRST DATA IMPORT COMMAND FOR INSTRUCTING THE SECOND ENCRYPTION MACHINE TO IMPORT THE DATA OF THE FIRST ENCRYPTION MACHINE, WHERE THE FIRST DATA IMPORT COMMAND IS SENT BY THE CONTROLLER FOR MANAGING UPGRADING OF ENCRYPTION MACHINE
S401

THE SECOND ENCRYPTION MACHINE PERFORMS THE IMPORT OPERATION ON THE FIRST DATA OF THE FIRST ENCRYPTION MACHINE
S402

FIG. 4

500 

THE SLB RECEIVES A FIRST NETWORK MIGRATION COMMAND SENT BY A CONTROLLER FOR MANAGING UPGRADING OF ENCRYPTION MACHINE, WHERE THE FIRST NETWORK MIGRATION COMMAND IS USED TO INSTRUCT THAT THE REQUEST OF THE SERVICE SYSTEM IS MIGRATED FROM THE FIRST ENCRYPTION MACHINE TO THE SECOND ENCRYPTION MACHINE
S501

THE SLB MIGRATES THE REQUEST OF THE SERVICE SYSTEM FROM THE FIRST ENCRYPTION MACHINE TO THE SECOND ENCRYPTION MACHINE ACCORDING TO THE FIRST NETWORK MIGRATION COMMAND
S502

FIG. 5

ENCRYPTION MACHINE UPGRADE, DATA IMPORT AND REQUEST MIGRATION METHOD, APPARATUS AND DEVICE

CROSS REFERENCE TO RELATED PATENT APPLICATIONS

This application claims priority to Chinese Patent Application No. 201810729817.0, filed on Jul. 5, 2018, entitled "ENCRYPTION MACHINE UPGRADE, DATA IMPORT AND REQUEST MIGRATION METHOD, APPARATUS AND DEVICE" which is hereby incorporated by reference in its entirety.

TECHNICAL FIELD

The present disclosure relates to the field of computer technologies, and in particular, to methods, apparatuses, electronic devices, and storage devices for upgrading encryption machines. The disclosure also relates to methods, apparatuses, electronic devices, and storage devices for importing data. The present disclosure also relates to methods, an apparatuses, electronic devices, and storage devices for migrating request of service systems.

BACKGROUND

With the continuous development of network technology, in order to ensure data security, many service data or keys need to be encrypted by encryption machine, i.e., a hardware security module (HSM).

In conventional techniques, the upgrade operation of the encryption machine is usually completed by an operator of the encryption machine manufacturer. The operator of the manufacturer connects the terminal device (such as a notebook and the like) to the encryption machine through the network, manually uploads the upgrade software package to predetermined directory of the disk of the encryption machine, and then logs in to the encryption host system (running on the operating system on the HSM) to execute the upgrade commands, and waits for results returned by the execution.

The process of upgrading the encryption machine in the conventional techniques involves the following problems, i.e., the operation is extremely complicated, which is easy to cause an operation error and interruption of user service.

SUMMARY

This Summary is provided to introduce a selection of concepts in a simplified form that is further described below in the Detailed Description. This Summary is not intended to identify all key features or features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure provides methods, apparatuses, electronic devices, and storage devices for upgrading encryption machine, and methods, apparatuses, electronic devices, and storage devices for importing data, and methods, an apparatuses, electronic devices, and storage devices for migrating request of service systems, to solve the following problems of the upgrade process of the encryption machine in the conventional techniques, i.e., the operation is extremely complicated, which is easy to cause an operation error and the interruption of user service.

The disclosure provides a method of upgrading encryption machine, including:

A method of upgrading encryption machine, including:

determining, by a controller for managing upgrading of encryption machine, a first encryption machine to be upgraded;

transferring, by the controller, data of the first encryption machine to a second encryption machine; and sending, by the controller, an upgrade command for instructing the first encryption machine to conduct upgrade, to the first encryption machine.

In an example embodiment, the method further includes:
receiving, by the controller, a result of upgrade operation returned by the first encryption machine.

In an example embodiment, transferring by the controller the data of the first encryption machine to the second encryption machine including:

sending, by the controller, a first data backup command for instructing the first encryption machine to conduct data backup, to the first encryption machine;

receiving, by the controller, first data returned by the first encryption machine, the first data being backup data obtained by backing up the data of the first encryption machine;

sending, by the controller, a first data import command for instructing the second encryption machine to import the first data, to the second encryption machine; and receiving, by the controller, an import result regarding the first data returned by the second encryption machine.

In an example embodiment, the method further includes:
storing, by the controller, the first data returned by the first encryption machine into a file storage device.

In an example embodiment, the method further includes:
sending, by the controller, a second data backup command for instructing the second encryption machine to conduct data backup, to the second encryption machine; and receiving, by the controller, second data returned by the second encryption machine, the second data being backup data obtained by backing up the data of the second encryption machine.

In an example embodiment, the method further includes:
storing, by the controller, the second data returned by the second encryption machine into the file storage device.

In an example embodiment, the method further includes:
sending, by the controller, a second data import command for instructing the first encryption machine to import the second data returned by the second encryption machine, to the first encryption machine; and receiving, by the controller, a second data import result returned by the first encryption machine.

In an example embodiment, the method further includes:
sending, by the controller, a migration command for instructing an SLB to migrate a service system request, to the SLB.

In an example embodiment, the method further includes:
receiving, by the controller, a migration result of the service system request returned by the SLB.

In an example embodiment, sending by the controller the migration command for instructing the SLB to migrate the service system request to the SLB includes:

sending, by the controller, a command for instructing the SLB to migrate the service system request from the first encryption machine to the second encryption machine, to the SLB; or sending, by the controller, a command for instructing the SLB to migrate the service system request from the second encryption machine to the first encryption machine, to the SLB.

In an example embodiment, the method further includes:

storing, by the controller, an upgrade software package for upgrading the first encryption machine into a file storage device; and sending by the controller an upgrade command for instructing the first encryption machine to conduct upgrade to the first encryption machine including: sending, by the controller, an upgrade command for instructing the first encryption machine to obtain an upgrade software package in the file storage device and utilize the upgrade software package to conduct the upgrade, to the first encryption machine.

The disclosure also provides a method of upgrading encryption machine, including:

receiving, by a first encryption machine, a first data backup command for instructing a first encryption machine to conduct data backup, the first data backup command being sent by a controller for managing upgrading of encryption machine, the first encryption machine being an encryption machine to be upgraded;

returning, by the first encryption machine, exported first data to the controller, the first data being backup data obtained by backing up data of the first encryption machine;

receiving, by the first encryption machine, an upgrade command for instructing the first encryption machine to conduct upgrade, the upgrade command being sent by the controller; and performing, by the first encryption machine, an upgrade operation according to the upgrade command.

In an example embodiment, the method further includes:

returning, by the first encryption machine, a result of upgrade operation to the controller.

In an example embodiment, performing the upgrading operation includes:

sending, by the first encryption machine, a request for obtaining an upgrade software package to a file storage device storing the upgrade software package, where the upgrade software package is a software package for upgrading encryption machine;

receiving, by the first encryption machine, the upgrade software package returned by the file storage device; and performing, by the first encryption machine, the upgrade operation according to the upgrade software package.

In an example embodiment, the method further includes:

receiving, by the first encryption machine, a second data import command sent by the controller, the second data import command being an import command for instructing the first encryption machine to import the second data of the second encryption machine;

obtaining, by the first encryption machine, second data of the second encryption machine, the second data being backup data obtained by backing up data of the second encryption machine; and performing, by the first encryption machine, an import operation on the second data of the second encryption machine.

In an example embodiment, obtaining by the first encryption machine the second data of the second encryption machine includes:

obtaining, by the first encryption machine, the second data of the second encryption machine from a file storage device storing the second data of the second encryption machine.

The disclosure also provides a method of data importing, including:

receiving, by a second encryption machine, a first data import command for instructing the second encryption machine to import data of a first encryption machine, the first data import command being sent by a controller for managing upgrading of encryption machine; and performing, by the second encryption machine, an import operation on first data of the first encryption machine, the first encryption machine being an encryption machine to be upgraded, and the first data being backup data obtained by backing up the data of the first encryption machine.

In an example embodiment, performing by the second encryption machine the import operation on the first data of the first encryption machine includes:

sending, by the second encryption machine, a request for obtaining the first data of the first encryption machine, to a file storage device storing the first data of the first encryption machine;

receiving, by the second encryption machine, the first data of the first encryption machine returned by the file storage device; and performing, by the second encryption machine, an import operation on the first data of the first encryption machine.

In an example embodiment, the method further includes:

receiving, by the second encryption machine, a second data backup command for instructing the second encryption machine to conduct data backup, the second data backup command being sent by the controller;

exporting, by the second encryption machine, second data according to the second data backup command, the second data being backup data obtained by backing up data of the second encryption machine; and returning, by the second encryption machine, exported second data to the controller.

The disclosure also provides a method of migrating a request of a service system, including:

receiving, by an SLB, a first network migration command sent by a controller for managing upgrading of encryption machine, the first network migration command being used to instruct that a request of a service system is migrated from a first encryption machine to a second encryption machine, the first encryption machine is an encryption machine to be upgraded; and migrating, by the SLB, the request of the service system from the first encryption machine to the second encryption machine according to the first network migration command.

In an example embodiment, the method further includes:

receiving, by the SLB, a second network migration command sent by the controller, the second network migration command being used to instruct that the request of the service system is migrated from the second encryption machine to the first encryption machine; and migrating the request of the service system from the second encryption machine to the first encryption machine according to the second network migration command.

The disclosure also provides an apparatus for upgrading encryption machine, including:

a first encryption machine determining unit, configured to determine, by a controller for managing upgrading of encryption machine, a first encryption machine to be upgraded;

a data transferring unit, configured to transfer, by the controller, data of the first encryption machine to a second encryption machine; and an upgrade command sending unit, configured to send, by the controller, an upgrade command for instructing the first encryption machine to conduct upgrade, to the first encryption machine.

The disclosure also provides an apparatus for upgrading encryption machine, including:

a data backup command receiving unit, configured to receive, by a first encryption machine, a first data backup command for instructing the first encryption machine to conduct data backup, the first data backup command being sent by a controller for managing upgrading of encryption machine, the first encryption machine being an encryption machine to be upgraded;

a data returning unit, configured to return, by the first encryption machine, exported first data to the controller, the first data being backup data obtained by backing up data of the first encryption machine;

an upgrade command receiving unit, configured to receive, by the first encryption machine, an upgrade command for instructing the first encryption machine to conduct upgrade, the upgrade command being sent by the controller; and an upgrade operation executing unit, configured to perform, by the first encryption machine, an upgrade operation according to the upgrade command.

The disclosure also provides a data importing device, including:

an import command receiving unit, configured to receive, by a second encryption machine, a first data import command for instructing the second encryption machine to import first data of a first encryption machine, the first data import command being sent by a controller for managing upgrading of encryption machine; and an import operation executing unit, configured to perform, by the second encryption machine, an import operation on the first data of the first encryption machine, the first encryption machine being an encryption machine to be upgraded, the first data being backup data obtained by backing up the data of the first encryption machine.

The disclosure also provides an apparatus for migrating a request of a service system, including:

a migration command receiving unit, configured to receive, by an SLB, a first network migration command sent by a controller for managing upgrading of encryption machine, wherein the first network migration command is used to instruct that a request of a service system is migrated from a first encryption machine to a second encryption machine, the first encryption machine being an encryption machine to be upgraded; and a migration unit, configured to migrate, by the SLB, the request of the service system from the first encryption machine to the second encryption machine according to the first network migration command.

The disclosure also provides an electronic device, including:

a processor; and memory, configured to store a program of a method of upgrading encryption machine, wherein after the device is powered on and runs the program of the method of upgrading the encryption machine by the processor, the following steps are performed:

determining, by a controller for managing upgrading of encryption machine, a first encryption machine to be upgraded;

transferring, by the controller, data of the first encryption machine to a second encryption machine; and sending, by the controller, an upgrade command for instructing the first encryption machine to conduct upgrade, to the first encryption machine.

The disclosure also provides an electronic device, including:

a processor; and memory, configured to store a program of a method of upgrading encryption machine, wherein after the device is powered on and runs the program of the method of upgrading the encryption machine by the processor, the following steps are performed:

receiving, by a first encryption machine, a first data backup command for instructing a first encryption machine to conduct data backup, the first data backup command being sent by a controller for managing upgrading of encryption machine, the first encryption machine being an encryption machine to be upgraded;

returning, by the first encryption machine, exported first data to the controller, the first data being backup data obtained by backing up data of the first encryption machine;

receiving, by the first encryption machine, an upgrade command for instructing the first encryption machine to conduct upgrade, the upgrade command being sent by the controller; and performing, by the first encryption machine, an upgrade operation according to the upgrade command.

The disclosure also provides an electronic device, including:

a processor; and memory, configured to store a program of a method of importing upgrade data, wherein after the device is powered on and runs the program of the method of importing upgrade data by the processor, the following steps are performed:

receiving, by a second encryption machine, a first data import command for instructing the second encryption machine to import data of a first encryption machine, the first data import command being sent by a controller for managing upgrading of encryption machine;

performing, by the second encryption machine, an import operation on first data of the first encryption machine, the first encryption machine being an encryption machine to be upgraded, and the first data being backup data obtained by backing up the data of the first encryption machine.

The disclosure also provides an electronic device, including:

a processor; and memory, configured to store a program of a method of migrating a request of a service system, wherein after the device is powered on and runs the program of the method of migrating the request of the service system by the processor, the following steps are performed:

receiving, by an SLB, a first network migration command sent by a controller for managing upgrading of encryption machine, the first network migration command being used to instruct that a request of a service system is migrated from a first encryption machine to a second encryption machine, the first encryption machine is an encryption machine to be upgraded; and migrating, by the SLB, the request of the service system from the first encryption machine to the second encryption machine according to the first network migration command.

The disclosure also provides a storage device, a program storing a method of upgrading encryption machine, the program being executed by the processor, performing the following steps:

determining, by a controller for managing upgrading of encryption machine, a first encryption machine to be upgraded;

transferring, by the controller, data of the first encryption machine to a second encryption machine; and sending, by the controller, an upgrade command for instructing the first encryption machine to conduct upgrade, to the first encryption machine.

The disclosure also provides a storage device, including:

a program storing a method of upgrading encryption machine, the program being executed by the processor, performing the following steps:

receiving, by a first encryption machine, a first data backup command for instructing a first encryption machine to conduct data backup, the first data backup command being sent by a controller for managing upgrading of encryption machine, the first encryption machine being an encryption machine to be upgraded;

returning, by the first encryption machine, exported first data to the controller, the first data being backup data obtained by backing up data of the first encryption machine;

receiving, by the first encryption machine, an upgrade command for instructing the first encryption machine to conduct upgrade, the upgrade command being sent by the controller; and performing, by the first encryption machine, an upgrade operation according to the upgrade command.

The disclosure also provides a storage device, including:

a second encryption machine, configured to receive a first data import command for instructing a second encryption machine to import data of a first encryption machine, the first data import command being sent by a controller for managing upgrading of encryption machine;

wherein the second encryption machine performs an import operation on first data of the first encryption machine, the first encryption machine being an encryption machine to be upgraded, and the first data being backup data obtained by backing up the data of the first encryption machine.

The disclosure also provides a storage device, including a program storing a method of migrating a request of a service system, the program being executed by a processor, performing the following steps:

receiving, by an SLB, a first network migration command sent by a controller for managing upgrading of encryption machine, the first network migration command being used to instruct that a request of a service system is migrated from a first encryption machine to a second encryption machine, the first encryption machine being an encryption machine to be upgraded; and migrating, by the SLB, the request of the service system from the first encryption machine to the second encryption machine according to the first network migration command.

Compared with the conventional techniques, the present disclosure has the following advantages:

The disclosure provides a method, a device, an electronic device and a storage device for upgrading encryption machine. The first encryption machine to be upgraded is determined by a controller for managing upgrading of encryption machine. Then, the controller transfers the data of the first encryption machine to the second encryption machine. Finally, the first encryption machine is instructed to perform the upgrade operation. The present disclosure solves the problem that in the process of upgrading the encryption machine in the conventional techniques, the operation is extremely complicated, which is easy to cause an operation error and interruption of user service.

BRIEF DESCRIPTION OF THE DRAWINGS

In order to illustrate the example embodiments of the present disclosure more clearly, the drawings used in the description of example embodiments are briefly introduced below. The drawings in the following description illustrate some of the example embodiments of the present disclosure, and other drawings may be obtained from these drawings by those skilled in the art without creative work.

FIG. 3 is a flowchart of another method of upgrading encryption machine according to the second example embodiment of the present disclosure.

FIG. 4 is a flowchart of a data import method according to the third example embodiment of the present disclosure.

FIG. 5 is a flowchart of a method of migrating a request of a service system according to the fourth example embodiment of the present disclosure.

DETAILED DESCRIPTION

Details are set forth in the description hereinafter in order to provide a thorough understanding of the disclosure. However, the present disclosure can be implemented in many other ways than those described herein. A person skilled in the art can make similar variations without departing from the spirit of the disclosure. Thus, the disclosure is not limited by the example embodiments discussed hereinafter.

The first example embodiment of the present disclosure provides a method of upgrading encryption machine.

Figure 1:
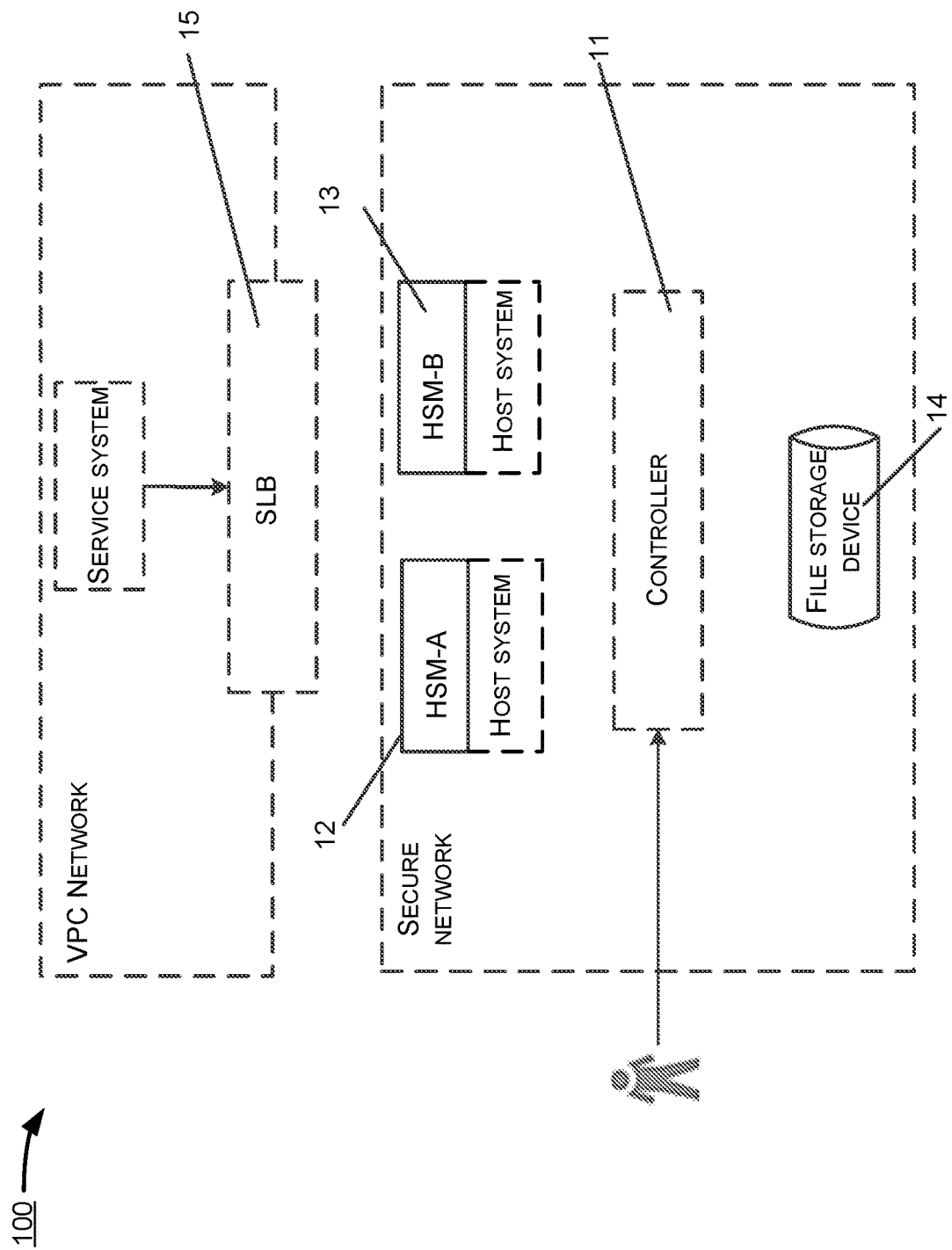
FIG. 1 is a schematic diagram of a system of managing upgrading of encryption machine using a controller according to the first example embodiment of the present disclosure.

Prior to introducing the first example embodiment, a brief introduction of FIG. 1 is made. The solid line box represents a hardware device (for example, HSM-A), and the dashed box represents a software device (for example, a controller).

As shown in FIG. 1, a system 100 for managing upgrading of encryption machine using a controller includes:

The controller 11: directly manages the software device of the HSM by calling the interface of the HSM.

HSM-A 12 and HSM-B 13: the core modules of the encryption machine, including the key storage chip and the encryption and decryption operation chip.

File Storage Device 14: responsible for storing the upgrade software package and data, ensuring high availability of the upgrade software package and data.

SLB 15: load balancing service, which is used as the network connection between the user's service system and the HSM.

The above system further includes:

Operator: encryption machine system administrator, responsible for managing the HSM, indirectly managing the HSM through the controller.

Host system: the operating system running on the HSM, responsible for network communication, process management, and other infrastructure functions, without getting involved in the key storage and encryption and decryption operations.

Service system: the user's service system, which needs to call the HSM to do some key operations or calculations.

Virtual Private Cloud (VPC): the user's secure virtual network. The user's service systems are all deployed in the VPC network to which the user's service systems belong.

Secure network: the secure network of the cloud vendor and the user's VPC network are securely isolated by default. The HSM and the controller are all deployed in the secure network.

The details are described hereinafter with reference to FIG. 1 and FIG. 2.

Figure 2:
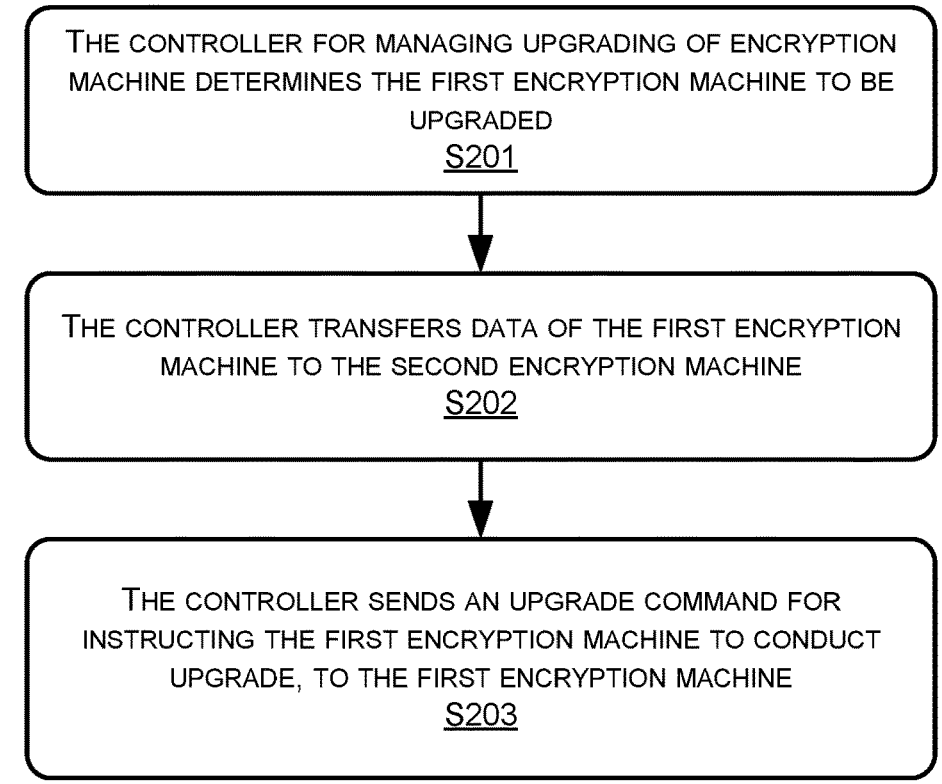
FIG. 2 is a flowchart of a method of upgrading encryption machine according to the first example embodiment of the present disclosure.

FIG. 2 is a flowchart of a method 200 for upgrading encryption machine according to the first example embodiment of the present disclosure. As shown in FIG. 2, in step S201, the controller for managing upgrading of encryption machine determines the first encryption machine to be upgraded.

The encryption machine refers to a hardware security module (HSM). As shown in FIG. 1, HSM-A 12 and HSM-B 13 are encryption machines.

The controller refers to a software device that directly manages the encryption machine by calling an interface of the encryption machine. As shown in FIG. 1, the controller 11 is a controller.

The controller can determine the first encryption machine to be upgraded by receiving an operator's request. For example, when the operator initiates the upgrade command, the ID of the encryption machine to be upgraded may be included in the command. The controller determines that the first encryption machine is to be upgraded according to the ID of the encryption machine.

As shown in FIG. 2, in step S202, the controller transfers data of the first encryption machine to the second encryption machine.

First, the controller transfers the data of the first encryption machine to the second encryption machine, and then sends an upgrade command for instructing the first encryption machine to conduct the upgrade, thereby avoiding the problem that the user service is interrupted during the upgrade process of the first encryption machine.

The controller transfers the data of the first encryption machine to the second encryption machine, including the following steps:

The controller sends the first data backup command for instructing the first encryption machine to conduct the data backup, to the first encryption machine.

The controller receives the first data returned by the first encryption machine. The first data is the backup data obtained by backing up data of the first encryption machine.

The controller sends a first data import command for instructing the second encryption machine to import the first data to the second encryption machine.

The controller receives an import result regarding the first data returned by the second encryption machine.

In order to avoid the problem that the user service is interrupted when the first encryption machine is upgraded by the controller, the data of the first encryption machine may be exported from the first encryption machine and imported to the second encryption machine, and the request of the service system on the first encryption machine is migrated to the second encryption machine. The second encryption machine may be an encryption machine which is reserved and does not provide external service. The data refers to the data mirroring of the encryption machine, which is used for backing up the user key, and is exported and stored after being encrypted by the encryption machine. The data includes the user's relevant data, the user's key, the user's configuration documents, the user's identifier, and so on.

After the controller sends the first data backup command for instructing the first encryption machine to conduct the data backup to the first encryption machine, the first encryption machine returns the first data to the controller after the data backup. The controller receives the first data returned by the first encryption machine.

After the controller receives the first data returned by the first encryption machine, the controller may send a first data import command for instructing the second encryption machine to import the first data of the first encryption machine, to the second encryption machine. After the second encryption machine performs the import on the first data of the first encryption machine, the result of whether the import is successful may be returned to the controller. The controller receives the import result regarding the first data returned by the second encryption machine.

Since there may be more than one controllers, the controller that receives the data backup of the first encryption machine and the controller that issues the first data import command may not be the same controller. In order to ensure that the second encryption machine can obtain the first data of the first encryption machine when the first data of the first encryption machine is imported, the controller can store the first data returned by the first encryption machine into the file storage device. Another advantage of storing the first data returned by the first encryption machine in the file storage device is that after the controller issues the first data import command for instructing the second encryption machine to import the data of the first encryption machine, the second encryption machine may make an error when performing data import, and the first data returned by the first encryption machine is transferred to the file storage device for retrying.

As shown in FIG. 2, in step S203, the controller sends an upgrade command for instructing the first encryption machine to conduct upgrade, to the first encryption machine.

The controller is used to send an upgrade command for instructing the first encryption machine to conduct the upgrade, to the first encryption machine, realizing the upgrade management of the first encryption machine by the controller.

Further, after the controller sends the upgrade command to the first encryption machine, the first encryption machine performs the upgrade operation. After the upgrade operation is completed, the controller can receive the result of the upgrade operation returned by the first encryption machine to determine whether the upgrade operation is successful.

After the first encryption machine performs the upgrade operation, for the first encryption machine to re-take the user's service, the data of the second encryption machine may be exported from the second encryption machine and imported to the first encryption machine, and the request of the service system on the second encryption machine is migrated to the first encryption machine.

The controller may send the second data backup command for instructing the second encryption machine to conduct the data backup, to the second encryption machine. The second encryption machine returns the second data to the controller after performing the data backup. The controller receives the second data returned by the second encryption machine, where the second data is the backup data obtained by backing up data of the second encryption machine.

After the controller receives the second data returned by the second encryption machine, the controller may send a second data import command for instructing the first encryption machine to import the second data of the second encryption machine, to the first encryption machine. After the first encryption performs the import on the second data of the second encryption machine, the result of whether the import is successful may be returned to the controller. The controller receives the import result regarding the second data of the second encryption machine returned by the first encryption machine.

Since there may be more than one controller, the controller that receives the second data of the second encryption machine and the controller that issues the second data import command may not be the same controller. In order to ensure that the first encryption machine can obtain the second data of the second encryption machine when the second data of the second encryption machine is imported, the controller can store the second data returned by the second encryption machine into the file storage device. Another advantage of storing the second data returned by the second encryption machine in the file storage device is that after the controller issues to the first encryption machine the second data import command for instructing the first encryption machine to import the data of the second encryption machine, the first encryption machine may make an error when performing data import, and the second data returned by the second encryption machine is transferred to the file storage device for retrying.

The controller may also send a migration command for instructing the SLB to migrate the service system request, to the SLB. SLB refers to the load balancing service as a channel opened between the VPC network and the secure network. As shown in FIG. 1, SLB 15 is an SLB.

The controller can also receive the migration result of the service system request returned by the SLB.

The service system refers to the relevant system of the customer who uses the encryption service. The request includes operations such as encryption and decryption, signature, and generation of a key.

The controller sends a migration command for instructing the SLB to migrate the service system request to the SLB, including:

The controller sends the SLB the command for instructing the SLB to migrate the request of the service system from the first encryption machine to the second encryption machine; or The controller sends the SLB the command for instructing the SLB to migrate the request of the service system from the second encryption machine to the first encryption machine.

Since there may be more than one controllers, the controller that executes the upgrade command after issuing the upgrade command and the controller that receives the upgrade software package for upgrading the first encryption machine may not be the same controller. In order to ensure all the controllers can read the upgrade software package, the controller can store the upgrade software package to the file storage device. The controller sends the upgrade command for instructing the first encryption machine to conduct the upgrade, to the first encryption machine, including: the controller sends the upgrade command to the first encryption machine to instruct the first encryption machine to obtain the upgrade software package in the file storage device and utilize the upgrade software package to conduct the upgrade.

The second example embodiment of the present disclosure provides a method of upgrading encryption machine. The details are described hereinafter with reference to FIG. 3.

FIG. 3 is a flowchart of another method 300 for upgrading encryption machine according to the second example embodiment of the present disclosure. As shown in FIG. 3, in step S301, the first encryption machine receives the first data backup command for instructing the first encryption machine to conduct the data backup, where the first data backup command is sent by the controller for managing upgrading of encryption machine. The first encryption machine is the encryption machine to be upgraded.

As shown in FIG. 3, in step S302, the first encryption machine returns the exported first data to the controller. The first data is the backup data obtained by backing up the data of the first encryption machine.

The controller may send the first data backup command for instructing the first encryption machine to conduct the data backup, to the first encryption machine. The first encryption machine may receive the first data backup command sent by the controller, and export the first data according to the first data backup command; then return the first data to the controller. In more details, exporting the first data includes the following steps: exporting user's key data from the first encryption machine chip, and packaging the user's configuration data and identifier; and then encrypting the packaged data using the primary key of the first encryption machine, and calculating the digest value of the encrypted data; and finally uploading the encrypted data and the digest value to the controller.

As shown in FIG. 3, in step S303, the first encryption machine receives the upgrade command for instructing the first encryption machine to conduct the upgrade, where the upgrade command is sent by the controller.

In order to avoid the problem that the user service is interrupted when the first encryption machine is upgraded by the controller, the data of the first encryption machine may be exported from the first encryption machine and imported to the second encryption machine, and the request of the service system on the first encryption machine is migrated to the second encryption machine. The second encryption machine may be an encryption machine that is reserved and does not provide external service.

As shown in FIG. 3, in step S304, the first encryption machine performs the upgrade operation according to the upgrade command.

When the controller stores the upgrade software package to the file storage device, performing the upgrade operation may include the following steps:

The first encryption machine sends a request for obtaining the upgrade software package to a file storage device storing the upgrade software package, where the upgrade software package is a software package for upgrading encryption machine.

The first encryption machine receives the upgrade software package returned by the file storage device.

The first encryption machine performs the upgrade operation according to the upgrade software package.

After the first encryption machine performs the upgrade operation, the first encryption machine may return the result of the upgrade operation to the controller.

After the controller receives the result that the first encryption machine performs the upgrade operation successfully, the first encryption machine may receive the second data import command sent by the controller. The second data import command is an import command for instructing the first encryption machine to import the data of the second encryption machine. After receiving the second data import command, the first encryption machine obtains the second data of the second encryption machine; and then performs the import operation on the second data of the second encryption machine. In an example embodiment, the second data of the second encryption machine is obtained, and the second data of the second encryption machine is obtained from the file storage device storing the second data of the second encryption machine.

The third example embodiment of the present disclosure provides a data import method. The details are described hereinafter with reference to FIG. 4.

FIG. 4 is a flowchart of a data import method 400 according to the third example embodiment of the present disclosure. As shown in FIG. 4, in step S401, the second encryption machine receives the first data import command for instructing the second encryption machine to import the data of the first encryption machine, where the first data import command is sent by the controller for managing upgrading of encryption machine.

As shown in FIG. 4, in step S402, the second encryption machine performs the import operation on the first data of the first encryption machine. The first encryption machine is the encryption machine to be upgraded. The first data is the backup data obtained by backing up the data of the first encryption machine.

The second encryption machine performs the import operation on the first data of the first encryption machine, including:

The second encryption machine sends a request for obtaining the first data of the first encryption machine to the file storage device storing the first data of the first encryption machine.

The second encryption machine receives the first data of the first encryption machine returned by the file storage device.

The second encryption machine performs the import operation on the first data of the first encryption machine.

In an example embodiment, the second encryption machine performs the import operation on the first data of the first encryption machine, including the following steps:

first, verifying the integrity of the first data of the first encryption machine; then, decrypting the first data using the primary key; and finally, importing the decrypted user key data into the second encryption machine chip, where the user's configuration data and related identifier are applied.

The second encryption machine may further receive the second data backup command for instructing the second encryption machine to conduct the data backup, where the second data backup command is sent by the controller; then export the second data according to the second data backup command; and then return the exported second data to the controller, where the second data is the backup data obtained by backing up the data of the second encryption machine.

The fourth example embodiment of the present disclosure provides a method 500 for migrating a request of a service system, which is described in detail hereinafter with reference to FIG. 5.

As shown in FIG. 5, in step S501, the SLB receives a first network migration command sent by a controller for managing upgrading of encryption machine, where the first network migration command is used to instruct that the request of the service system is migrated from the first encryption machine to the second encryption machine. The first encryption machine is the encryption machine to be upgraded.

In Step S502, the SLB migrates the request of the service system from the first encryption machine to the second encryption machine according to the first network migration command.

The SLB may further receive a second network migration command sent by the controller, where the second network migration command is used to instruct that the request of the service system is migrated from the second encryption machine to the first encryption machine. The request of the service system is migrated from the second encryption machine to the first encryption machine according to the network migration command.

Figure 6:
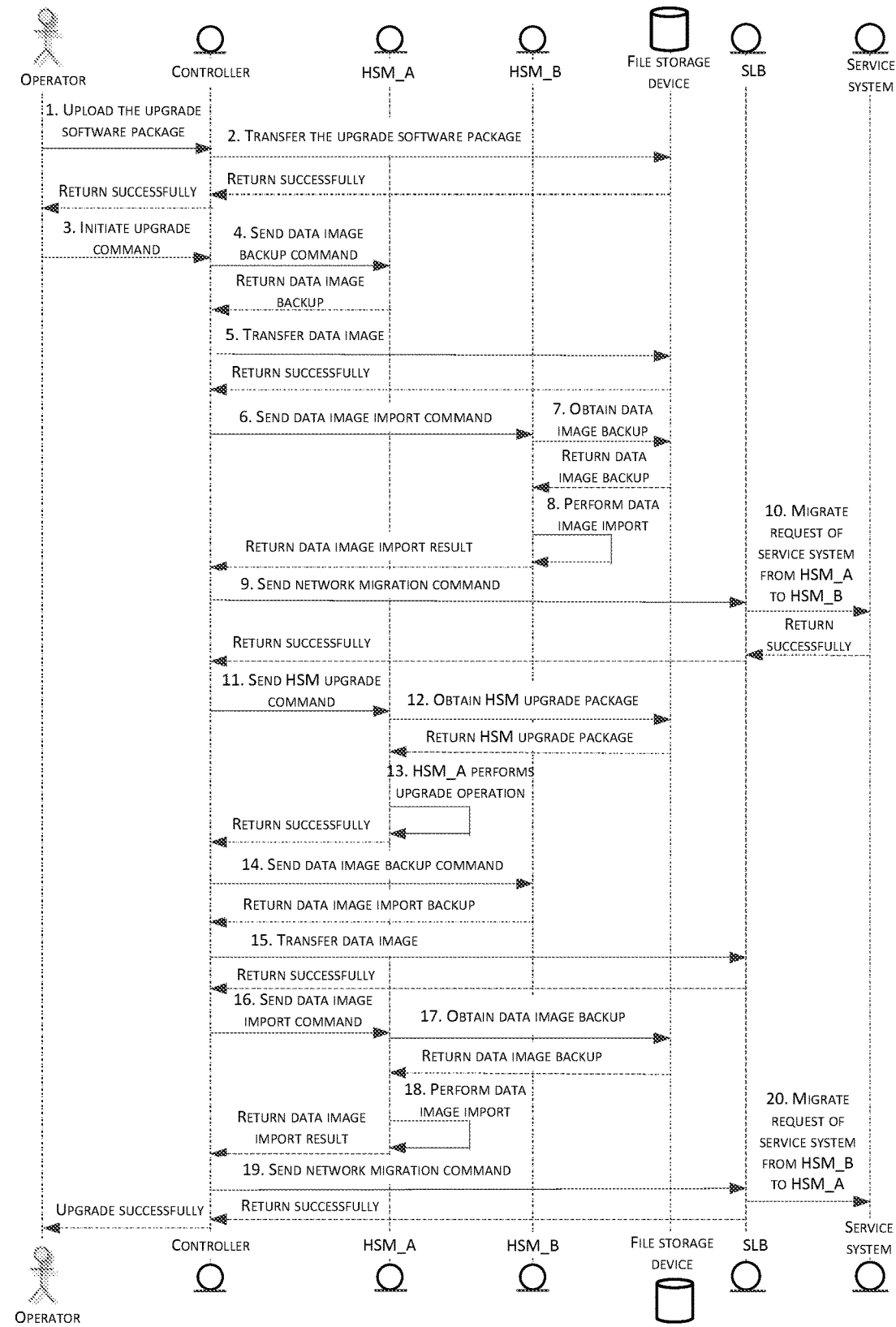
FIG. 6 is an interaction diagram of a process of managing upgrading of the first encryption machine by the controller according to the present disclosure.

Since the foregoing four example embodiments are all introduced from one side, in order to more clearly show the process of managing the first encryption machine upgrade by the controller, hereinafter, descriptions are made with reference to FIG. 6.

1. The operator uploads the upgrade software package to the controller.

2. The controller transfers the upgrade software package to the file storage (file storage device).

3. The operator selects the HSM_A (the first encryption machine) to be upgraded and issues the upgrade command.

4. After receiving the operator's request, the controller issues the first data backup command to HSM_A. After receiving the request, HSM_A performs data export and uploads the data backup (the first data) to the controller.

5. The controller receives the first data uploaded by HSM_A and transfers the first data to the file storage.

6. After transferring the first data of the HSM_A, the controller issues the first data import command to the HSM_B (the second encryption machine).

7. After receiving the request, HSM_B would obtain the first data of the HSM_A backup from the file storage.

8. HSM_B performs the data import operation. After HSM_B completes the import, the import result of the first data is returned to the controller.

9. After receiving the result that the HSM_B completes the import operation, the controller issues the network migration command to the SLB.

10. After receiving the request, SLB would migrate all requests sent by the service system to HSM_A to HSM_B. After the migration is completed, the result is returned to the controller.

11. After receiving the return result of the SLB, the controller sends an upgrade command to HSM_A.

12. After receiving the request, HSM_A would obtain the HSM upgrade software package from the file storage.

13. HSM_A performs the upgrade operation. After the upgrade is completed, the result would be returned to the controller.

14. After receiving the result that the HSM_A upgrade is completed, the controller issues the second data backup command to the HSM_B. After receiving the request, HSM_B would perform data export and upload the data backup (the second data) to the controller.

15. After receiving the data backup uploaded by HSM_B, the controller would transfer the data backup to the file storage.

16. After the data backup of the HSM_B is transferred, the controller issues the second data import command to the HSM_A.

17. After receiving the request, HSM_A obtains the data backup that is backed up by the HSM_B from the file storage.

18. HSM_A performs the data import operation. After the import is completed, the result of data import is returned to the controller.

19. After receiving the result that HSM_A completes the import operation, the controller issues the network migration command to the SLB.

20. After receiving the request, the SLB would migrate all requests sent by the service system to HSM_B to HSM_A. After the migration is completed, the result is returned to the controller. After receiving the result returned by the SLB, the controller would return the result to the operator to inform the upgrade completion.

Corresponding to the method of upgrading encryption machine provided above, the fifth example embodiment of the present disclosure also provides an apparatus for upgrading encryption machine.

Figure 7:
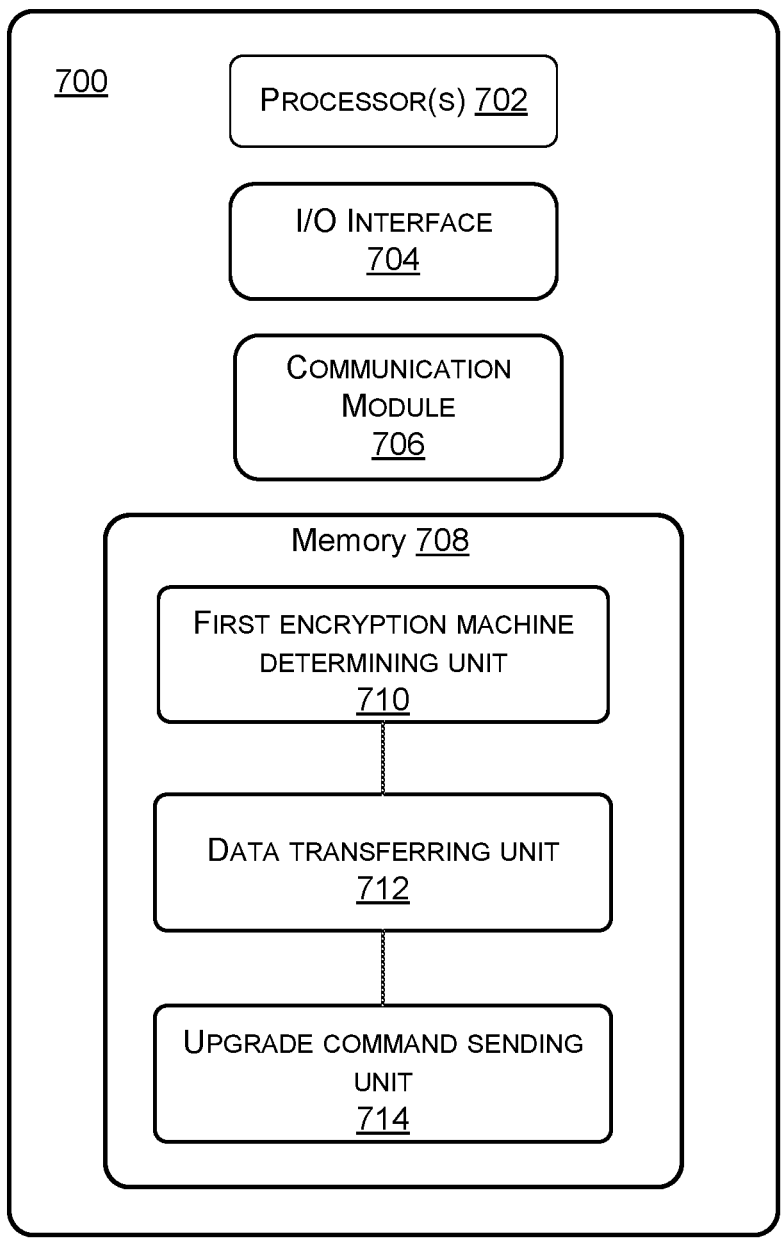
FIG. 7 is a schematic diagram of an apparatus for upgrading encryption machine according to the fifth example embodiment of the present disclosure.

As shown in FIG. 7, an apparatus 700 for upgrading encryption machine includes one or more processors 702, an input/output module 704, a communication module 706, and a memory 708. The input/output module 704 is configured to receive data/signal to be processed and to output the processed data/signal. The communication module 706 is configured to allow the apparatus 700 to communicate with other devices (not shown) over a network (not shown). The memory 708 stores thereon computer-executable modules executable by the one or more processors 702, the computer-executable modules may include a first encryption machine determining unit 710, a data transferring unit 712, and an upgrade command sending unit 714.

The first encryption machine determining unit 710 is configured to determine, by the controller for managing upgrading of encryption machine, the first encryption machine to be upgraded.

The data transferring unit 712 is configured to transfer, by the controller, data of the first encryption machine to the second encryption machine.

The upgrade command sending unit 714 is configured to send, by the controller, to the first encryption machine, the upgrade command for instructing the first encryption machine to conduct the upgrade.

In an example embodiment, the apparatus further includes:

A result of the upgrade operation receiving unit is configured to receive, by the controller, the result of the upgrade operation returned by the first encryption machine.

In an example embodiment, the data transferring unit is configured to perform the following steps:

The controller sends the first data backup command for instructing the first encryption machine to conduct the data backup, to the first encryption machine.

The controller receives the first data returned by the first encryption machine. The first data is the backup data obtained by backing up the data of the first encryption machine.

The controller sends the first data import command for instructing the second encryption machine to import the first data, to the second encryption machine.

The controller receives the import result regarding the first data returned by the second encryption machine.

In an example embodiment, the apparatus further includes:

A data backup storage unit is configured to store, by the controller, the first data returned by the first encryption machine into the file storage device.

In an example embodiment, the apparatus further includes:

The second data backup command sending unit is configured to send, by the controller, to the second encryption machine, the second data backup command for instructing the second encryption machine to conduct the data backup.

A second data backup receiving unit is configured to receive, by the controller, the second data returned by the second encryption machine. The second data is the backup data obtained by backing up the data of the second encryption machine.

In an example embodiment, the apparatus further includes:

A second data backup storage unit is configured to store, by the controller, second data returned by the second encryption machine into the file storage device.

In an example embodiment, the apparatus further includes:

A second data import command sending unit is configured to send, by the controller, to the first encryption machine, the second data import command for instructing the first encryption machine to import the second data returned by the second encryption machine.

A second data import result receiving unit is configured to receive, by the controller, the second data import result returned by the first encryption machine.

In an example embodiment, the apparatus further includes:

A migration command sending unit is configured to send, by the controller, to the SLB, the migration command for instructing the SLB to migrate the service system request.

In an example embodiment, the apparatus further includes:

A migration result receiving unit is configured to receive, by the controller, a migration result of the service system request returned by the SLB.

In an example embodiment, the migration command sending unit is configured to perform the following steps:

The controller sends the command for instructing the SLB to migrate the request of the service system from the first encryption machine to the second encryption machine, to the SLB; or The controller sends the command for instructing the SLB to migrate the request of the service system from the second encryption machine to the first encryption machine, to the SLB.

In an example embodiment, the apparatus further includes:

The upgrade software package storage unit is configured to store, by the controller, the upgrade software package for upgrading the first encryption machine into the file storage device.

The upgrade command sending unit is configured to perform the following steps: the controller sends the upgrade command to the first encryption machine to instruct the first encryption machine to obtain the upgrade software package in the file storage device and utilize the upgrade software package to conduct the upgrade.

It should be noted that, for a detailed description of the apparatus for upgrading encryption machine provided by the fifth example embodiment of the present disclosure, reference may be made to the related description of the first example embodiment of the present disclosure, and details are not described herein again.

Corresponding to another method of upgrading encryption machine provided above, the sixth example embodiment of the present disclosure also provides another apparatus for upgrading encryption machine.

Figure 8:
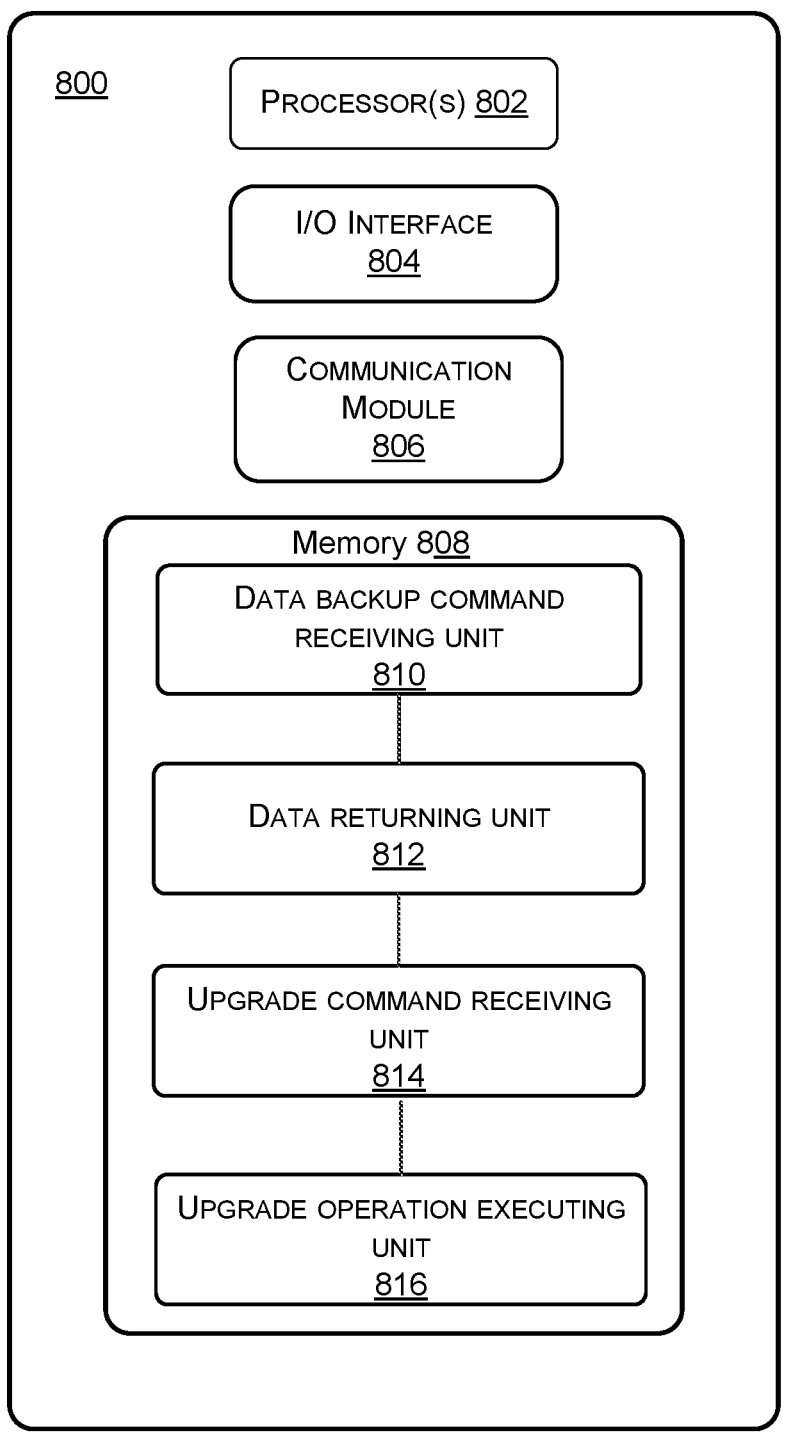
FIG. 8 is a schematic diagram of another apparatus for upgrading encryption machine according to the sixth example embodiment of the present disclosure.

As shown in FIG. 8, the apparatus 800 for upgrading encryption machine includes one or more processors 802, an input/output module 804, a communication module 806, and a memory 808. The input/output module 804 is configured to receive data/signal to be processed and to output the processed data/signal. The communication module 806 is configured to allow the apparatus 800 to communicate with other devices (not shown) over a network (not shown). The memory 808 stores thereon computer-executable modules executable by the one or more processors 808, the computer-executable modules may include a data backup command receiving unit 810, a data returning unit 812, an upgrade command receiving unit 814, and an upgrade operation executing unit 816.

The data backup command receiving unit 810 is configured to receive, by the first encryption machine, the first data backup command for instructing the first encryption machine to conduct the data backup, where the first data backup command is sent by the controller for managing upgrading of encryption machine. The first encryption machine is the encryption machine to be upgraded.

The data returning unit 812, the first encryption machine returns the exported first data to the controller. The first data is the backup data obtained by backing up the data of the first encryption machine.

The upgrade command receiving unit 814 is configured to receive, by the first encryption machine, the upgrade command for instructing the first encryption machine to conduct the upgrade, where the upgrade command is sent by the controller.

The upgrade operation executing unit 816 is configured to perform, by the first encryption machine, the upgrade operation according to the upgrade command.

In an example embodiment, the apparatus further includes:

An upgrade operation result returning unit is configured to return the result of the upgrade operation to the controller by the first encryption machine.

In an example embodiment, performing the upgrading operation includes:

The first encryption machine sends a request for obtaining the upgrade software package to a file storage device storing the upgrade software package, where the upgrade software package is a software package for upgrading encryption machine.

The first encryption machine receives the upgrade software package returned by the file storage device.

The first encryption machine performs the upgrade operation according to the upgrade software package.

In an example embodiment, the apparatus further includes:

A second data import command receiving unit is configured to receive, by the first encryption machine, the second data import command sent by the controller. The second data import command is an import command for instructing the first encryption machine to import the data of the second encryption machine.

A second data obtaining unit is configured to obtain, by the first encryption machine, the data backup of the second encryption machine.

An import operation executing unit is configured to obtain, by the first encryption machine, the second data of the second encryption machine. The second data is the backup data obtained by backing up the data of the second encryption machine.

A first encryption machine performs the import operation on the second data of the second encryption machine.

In an example embodiment, the second data obtaining unit is configured to perform the following steps:

The first encryption machine obtains the second data of the second encryption machine from the file storage device storing the second data of the second encryption machine.

It should be noted that, for a detailed description of the apparatus for upgrading encryption machine provided by the sixth example embodiment of the present disclosure, reference may be made to the related description of the second example embodiment of the present disclosure, and details are not described herein again.

Corresponding to the data import method provided above, the seventh example embodiment of the present disclosure also provides a data import apparatus.

Figure 9:
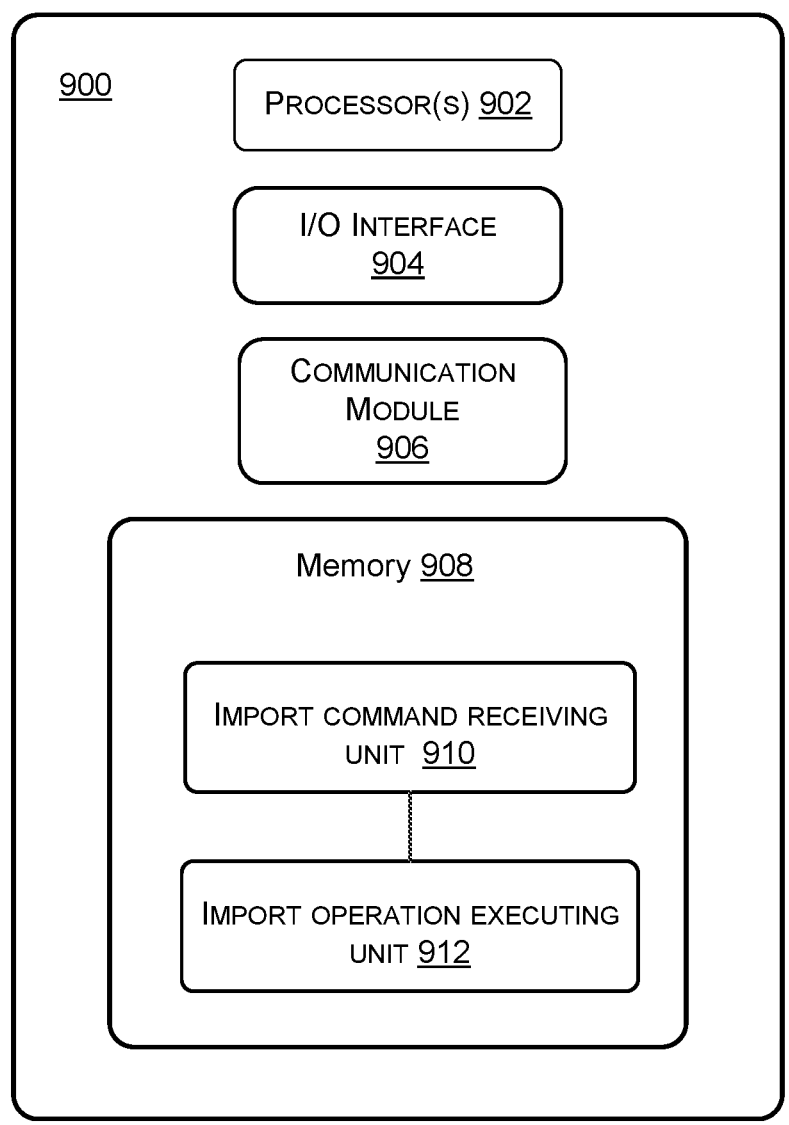
FIG. 9 is a schematic diagram of a data import apparatus according to the seventh example embodiment of the present disclosure.

As shown in FIG. 9, the data import apparatus 900 includes one or more processors 902, an input/output module 904, a communication module 906, and a memory 908. The input/output module 904 is configured to receive data/signal to be processed and to output the processed data/signal. The communication module 906 is configured to allow the apparatus 900 to communicate with other devices (not shown) over a network (not shown). The memory 908 stores thereon computer-executable modules executable by the one or more processors 902, the computer-executable modules may include an import command receiving unit 910 and an import operation executing unit 912.

The import command receiving unit 910 is configured to receive, by the second encryption machine, the first data import command for instructing the second encryption machine to import the first data of the first encryption machine, where the first data import command is sent by the controller for managing upgrading of encryption machine.

The import operation executing unit 912 is configured to perform, by the second encryption machine, the import operation on the first data of the first encryption machine. The first encryption machine is the encryption machine to be upgraded. The first data is the backup data obtained by backing up the data of the first encryption machine.

In an example embodiment, the import operation executing unit 912 is configured to perform the following steps:

The second encryption machine sends a request for obtaining the first data of the first encryption machine to the file storage device storing the first data of the first encryption machine.

The second encryption machine receives the first data of the first encryption machine returned by the file storage device.

The second encryption machine performs the import operation on the first data of the first encryption machine.

In an example embodiment, the apparatus further includes:

A second data backup command receiving unit is configured to receive, by the second encryption machine, the second data backup command for instructing the second encryption machine to conduct the data backup, where the second data backup command is sent by the controller.

A data backup and export unit is configured to export, by the second encryption machine, the second data according to the second data backup command.

A data backup returning unit is configured to return, by the second encryption machine, the exported second data to the controller.

It should be noted that, for a detailed description of the data import apparatus provided in the seventh example embodiment of the present disclosure, reference may be made to the related description of the third example embodiment of the present disclosure, and details are not described herein again.

Corresponding to the method of migrating a request of a service system provided above, the eighth example embodiment of the present disclosure also provides an apparatus for migrating a request of a service system.

Figure 10:
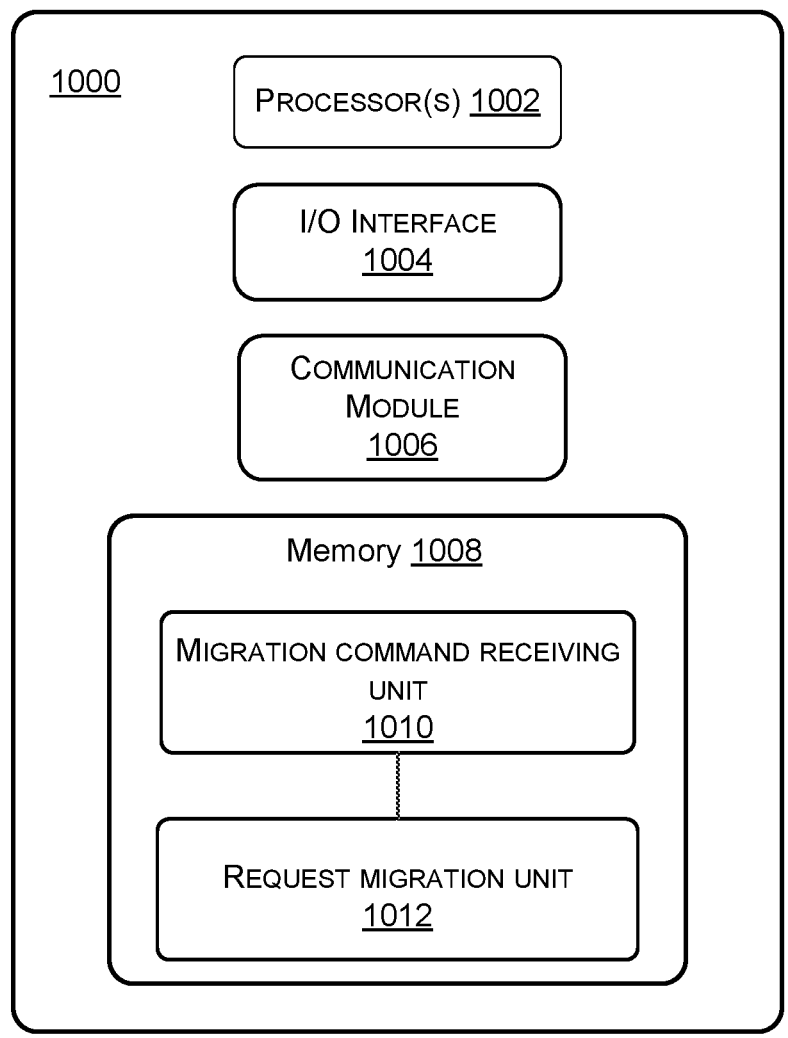
FIG. 10 is a schematic diagram of an apparatus of migrating a request of a service system according to the eighth example embodiment of the present disclosure.

As shown in FIG. 10, an apparatus 1000 for migrating a request of a service system one or more processors 1002, an input/output module 1004, a communication module 1006, and a memory 1008. The input/output module 1004 is configured to receive data/signal to be processed and to output the processed data/signal. The communication module 1006 is configured to allow the apparatus 1000 to communicate with other devices (not shown) over a network (not shown). The memory 1008 stores thereon computer-executable modules executable by the one or more processors 1002, the computer-executable modules may include a migration command receiving unit 1010 and a request migration unit 1012.

The migration command receiving unit 1010 is configured to receive, by the SLB, a first network migration command sent by the controller for managing upgrading of encryption machine, where the first network migration command is used to instruct that the request of the service system is migrated from the first encryption machine to the second encryption machine. The first encryption machine is the encryption machine to be upgraded.

The migration unit 1012 is configured to migrate, by the SLB, the request of the service system from the first encryption machine to the second encryption machine according to the first network migration command.

In an example embodiment, the apparatus further includes:

A second network migration command receiving unit is configured to receive, by the SLB, a second network migration command sent by the controller, where the second network migration command is used to instruct that the request of the service system is migrated from the second encryption machine to the first encryption machine.

A migration unit is configured to migrate the request of the service system from the second encryption machine to the first encryption machine according to the second network migration command.

It should be noted that the detailed description of the apparatus for migrating a request of a service system provided by the eighth example embodiment of the present disclosure may be referred to the related description of the fourth example embodiment of the present disclosure, and details are not described herein again.

Corresponding to the method of upgrading encryption machine provided above, the ninth example embodiment of the present disclosure also provides an electronic device.

Figure 11:
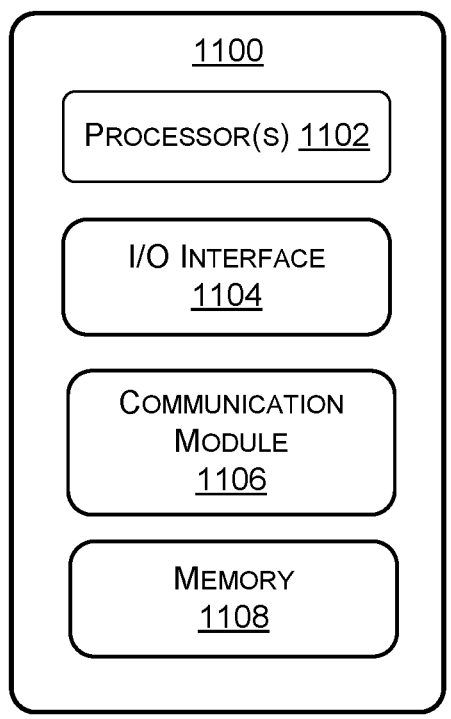
FIG. 11 is a schematic diagram of an electronic device according to the ninth example embodiment of the present disclosure.

As shown in FIG. 11, an electronic device 1100 includes one or more processors 1102, an input/output module 1104, a communication module 1106, and a memory 1108. The input/output module 1104 is configured to receive data/signal to be processed and to output the processed data/signal. The communication module 1106 is configured to allow the electronic device 1100 to communicate with other devices (not shown) over a network (not shown).

The memory 1108 is configured to store a program of a method of upgrading the encryption machine. After the device is powered on and runs the program of the method of upgrading the encryption machine by the processor, the following steps are performed:

The controller for managing upgrading of encryption machine determines the first encryption machine to be upgraded.

The controller transfers the data of the first encryption machine to the second encryption machine.

The controller sends the upgrade command for instructing the first encryption machine to conduct the upgrade, to the first encryption machine.

In an example embodiment, the electronic device further performs the following step:

The controller receives the result of the upgrade operation returned by the first encryption machine.

In an example embodiment, the controller transfers the data of the first encryption machine to the second encryption machine, including:

The controller sends the first data backup command for instructing the first encryption machine to conduct the data backup, to the first encryption machine.

The controller receives the first data returned by the first encryption machine. The first data is the backup data obtained by backing up the data of the first encryption machine.

The controller sends the first data import command for instructing the second encryption machine to import the first data to the second encryption machine.

The controller receives the import result regarding the first data returned by the second encryption machine.

In an example embodiment, the electronic device further performs the following step:

The controller stores the first data returned by the first encryption machine into the file storage device.

In an example embodiment, the electronic device further performs the following steps:

The controller sends the second data backup command for instructing the second encryption machine to conduct the data backup, to the second encryption machine.

The controller receives the second data returned by the second encryption machine. The second data is the backup data obtained by backing up the data of the second encryption machine.

In an example embodiment, the electronic device further performs the following step:

The controller stores the second data returned by the second encryption machine into the file storage device.

In an example embodiment, the electronic device further performs the following steps:

The controller sends the second data import command to the first encryption machine, where the second data import command is used to instruct the first encryption machine to import the returned second data of the second encryption machine.

The controller receives the second data import result returned by the first encryption machine.

In an example embodiment, the electronic device further performs the following step:

The controller sends the migration command for instructing the SLB to migrate the service system request, to the SLB.

In an example embodiment, the electronic device further performs the following step:

The controller receives the migration result of the service system request returned by the SLB.

In an example embodiment, the controller sends the migration command for instructing the SLB to migrate the service system request, to the SLB, including:

The controller sends the command for instructing the SLB to migrate the request of the service system from the first encryption machine to the second encryption machine, to the SLB; or The controller sends the command for instructing the SLB to migrate the request of the service system from the second encryption machine to the first encryption machine, to the SLB.

In an example embodiment, the electronic device further performs the following steps:

The controller stores the upgrade software package for upgrading the first encryption machine into the file storage device.

The controller sends the upgrade command for instructing the first encryption machine to conduct the upgrade, to the first encryption machine, including: the controller sends the upgrade command to the first encryption machine to instruct the first encryption machine to obtain the upgrade software package in the file storage device and utilize the upgrade software package to conduct the upgrade.

It should be noted that, for a detailed description of the electronic device provided by the ninth example embodiment of the present disclosure, reference may be made to the related description of the first example embodiment of the present disclosure, and details are not described herein again.

Corresponding to another method of upgrading encryption machine provided above, the tenth example embodiment of the present disclosure also provides an electronic device.

Figure 12:
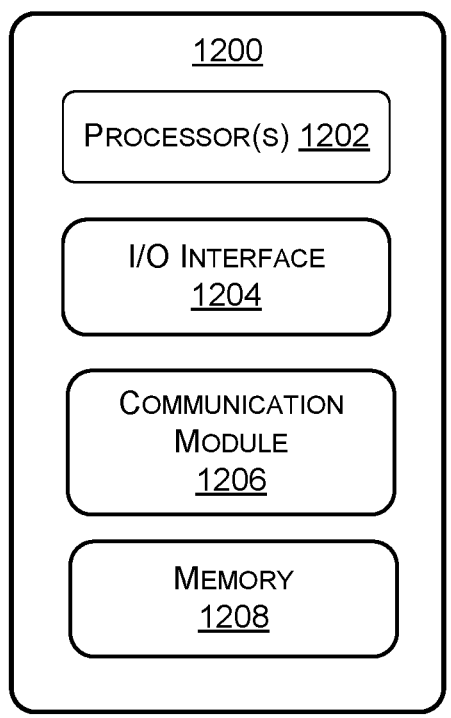
FIG. 12 is a schematic diagram of an electronic device according to the tenth example embodiment of the present disclosure.

As shown in FIG. 12, an electronic device 1200 includes one or more processors 1202, an input/output module 1204, a communication module 1206, and a memory 1208. The input/output module 1204 is configured to receive data/signal to be processed and to output the processed data/signal. The communication module 1206 is configured to allow the electronic device 1200 to communicate with other devices (not shown) over a network (not shown).

The memory 1208 is configured to store a program of a method of upgrading the encryption machine. After the device is powered on and runs the program of the method of upgrading the encryption machine by the processor, the following steps are performed:

The first encryption machine receives the first data backup command for instructing the first encryption machine to conduct the data backup, where the first data backup command is sent by the controller for managing upgrading of encryption machine. The first encryption machine is the encryption machine to be upgraded.

The first encryption machine returns the exported first data to the controller. The first data is the backup data obtained by backing up the data of the first encryption machine.

The first encryption machine receives the upgrade command for instructing the first encryption machine to conduct the upgrade, where the upgrade command is sent by the controller.

The first encryption machine performs the upgrade operation according to the upgrade command.

In an example embodiment, the electronic device further performs the following step:

The first encryption machine returns the result of the upgrade operation to the controller.

In an example embodiment, performing the upgrading operation includes:

The first encryption machine sends a request for obtaining the upgrade software package to the file storage device storing the upgrade software package, where the upgrade software package is a software package for upgrading encryption machine.

The first encryption machine receives the upgrade software package returned by the file storage device.

The first encryption machine performs the upgrade operation according to the upgrade software package.

In an example embodiment, the electronic device further performs the following steps:

The first encryption machine receives the second data import command sent by the controller. The second data import command is an import command for instructing the first encryption machine to import the second data of the second encryption machine.

The first encryption machine obtains the second data of the second encryption machine. The second data is the backup data obtained by backing up the data of the second encryption machine.

The first encryption machine performs the import operation on the second data of the second encryption machine.

In an example embodiment, the first encryption machine obtains the second data of the second encryption machine, including:

The first encryption machine obtains the second data of the second encryption machine from the file storage device storing the second data of the second encryption machine.

It should be noted that, for a detailed description of the electronic device provided by the tenth example embodiment of the present disclosure, reference may be made to the related description of the second example embodiment of the present disclosure, and details are not described herein again.

Corresponding to the data import method provided above, the eleventh example embodiment of the present disclosure also provides an electronic device.

Figure 13:
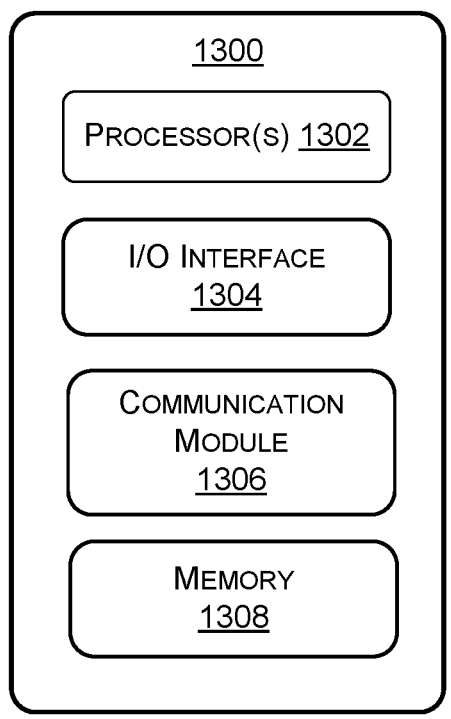
FIG. 13 is a schematic diagram of an electronic device according to the eleventh example embodiment of the present disclosure.

As shown in FIG. 13, the electronic device includes one or more processors 1302, an input/output module 1304, a communication module 1306, and a memory 1308. The input/output module 1304 is configured to receive data/signal to be processed and to output the processed data/signal. The communication module 1306 is configured to allow the electronic device 1300 to communicate with other devices (not shown) over a network (not shown).

The memory 1308 is configured to store a program of a method of importing upgrade data. After the device is powered on and runs the program of the method of importing upgrade data by the processor, the following steps are performed:

The second encryption machine receives the first data import command for instructing the second encryption machine to import the data of the first encryption machine, where the first data import command is sent by the controller for managing upgrading of encryption machine.

The second encryption machine performs the import operation on the first data of the first encryption machine. The first encryption machine is the encryption machine to be upgraded. The first data is the backup data obtained by backing up the data of the first encryption machine.

In an example embodiment, the second encryption machine performs the import operation on the first data of the first encryption machine, including:

The second encryption machine sends a request for obtaining the first data of the first encryption machine to the file storage device storing the first data of the first encryption machine.

The second encryption machine receives the first data of the first encryption machine returned by the file storage device.

The second encryption machine performs the import operation on the first data of the first encryption machine.

In an example embodiment, the electronic device further performs the following steps:

The second encryption machine receives the second data backup command for instructing the second encryption machine to conduct the data backup, where the second data backup command is sent by the controller.

The second encryption machine exports second data according to the second data backup command. The second data is the backup data obtained by backing up the data of the second encryption machine.

The second encryption machine returns the exported second data to the controller.

It should be noted that, for a detailed description of the electronic device provided by the eleventh example embodiment of the present disclosure, reference may be made to the related description of the third example embodiment of the present disclosure, and details are not described herein again.

Corresponding to the method of migrating the request of the service system provided above, the twelfth example embodiment of the present disclosure also provides an electronic device.

Figure 14:
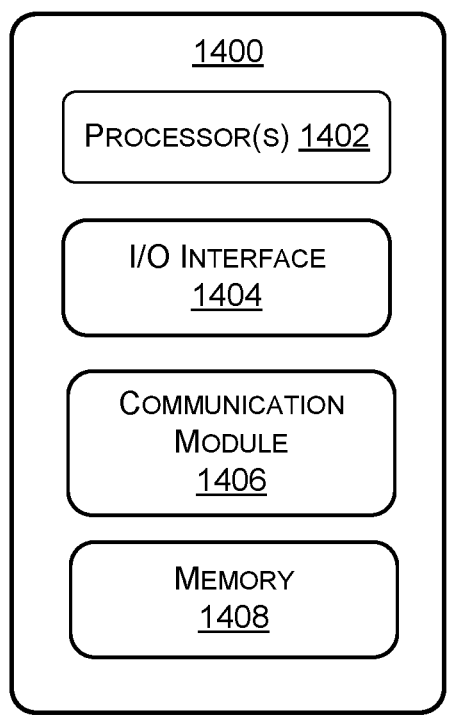
FIG. 14 is a schematic diagram of an electronic device according to the twelfth example embodiment of the present disclosure

As shown in FIG. 14, the electronic device includes one or more processors 1402, an input/output module 1404, a communication module 1406, and a memory 1408. The input/output module 1404 is configured to receive data/signal to be processed and to output the processed data/signal. The communication module 1406 is configured to allow the electronic device 1400 to communicate with other devices (not shown) over a network (not shown).

The memory 1408 is configured to store a program of a method of migrating a request of a service system. After the device is powered on and runs the program of the method of migrating the request of the service system by the processor, the following steps are performed:

The SLB receives the first network migration command sent by the controller for managing upgrading of encryption machine. The first network migration command is used to instruct that the request of the service system is migrated from the first encryption machine to the second encryption machine. The first encryption machine is the encryption machine to be upgraded.

The SLB migrates the request of the service system from the first encryption machine to the second encryption machine according to the first network migration command.

In an example embodiment, the electronic device further performs the following steps:

The SLB receives the second network migration command sent by the controller. The second network migration command is used to instruct that the request of the service system is migrated from the second encryption machine to the first encryption machine.

The request of the service system is migrated from the second encryption machine to the first encryption machine according to the second network migration command.

It should be noted that, for a detailed description of the electronic device provided by the twelfth example embodiment of the present disclosure, reference may be made to the related description of the fourth example embodiment of the present disclosure, and details are not described herein again.

The thirteenth example embodiment of the present disclosure also provides a storage device, including:

A program storing a method of upgrading encryption machine, when is executed by the processor, performs the following steps:

The controller for managing upgrading of encryption machine determines the first encryption machine to be upgraded.

The controller transfers data of the first encryption machine to the second encryption machine.

The controller sends the upgrade command for instructing the first encryption machine to conduct the upgrade, to the first encryption machine.

It should be noted that, for a detailed description of the storage device provided by the thirteenth example embodiment of the present disclosure, reference may be made to the related description of the first example embodiment of the present disclosure, and details are not described herein again.

The fourteenth example embodiment of the present disclosure also provides a storage device, including:

A program storing a method of upgrading encryption machine, when executed by the processor, performs the following steps:

The first encryption machine receives the first data backup command for instructing the first encryption machine to conduct the data backup, where the first data backup command is sent by the controller for managing upgrading of encryption machine. The first encryption machine is the encryption machine to be upgraded.

The first encryption machine returns the exported first data to the controller. The first data is the backup data obtained by backing up the data of the first encryption machine.

The first encryption machine receives the upgrade command for instructing the first encryption machine to conduct the upgrade, where the upgrade command is sent by the controller.

The first encryption machine performs the upgrade operation according to the upgrade command.

It should be noted that, for a detailed description of the storage device provided by the fourteenth example embodiment of the present disclosure, reference may be made to the related description of the second example embodiment of the present disclosure, and details are not described herein again.

The fifteenth example embodiment of the present disclosure also provides a storage device, including:

A program storing a method of migrating upgrade data, when executed by the processor, performs the following steps:

The second encryption machine receives the first data import command for instructing the second encryption machine to import the data of the first encryption machine, where the first data import command is sent by the controller for managing upgrading of encryption machine.

The second encryption machine performs the import operation on the first data of the first encryption machine. The first encryption machine is the encryption machine to be upgraded. The first data is the backup data obtained by backing up the data of the first encryption machine.

It should be noted that, for a detailed description of the storage device provided by the fifteenth example embodiment of the present disclosure, reference may be made to the related description of the third example embodiment of the present disclosure, and details are not described herein again.

The sixteenth example embodiment of the present disclosure also provides a storage device, including:

A program storing a method for migrating a request of a service system, when executed by the processor, performs the following steps:

The SLB receives the first network migration command sent by the controller for managing upgrading of encryption machine. The first network migration command is used to instruct that the request of the service system is migrated from the first encryption machine to the second encryption machine. The first encryption machine is the encryption machine to be upgraded.

The SLB migrates the request of the service system from the first encryption machine to the second encryption machine according to the first network migration command.

It should be noted that, for a detailed description of the storage device provided by the sixteenth example embodiment of the present disclosure, reference may be made to the related description of the fourth example embodiment of the present disclosure, and details are not described herein again.

The present disclosure is discussed with reference to the above-example embodiments; however, the example embodiments not intended to limit the present disclosure. One skilled in the art can make any possible variations and modifications without departing from the spirit and scope of the disclosure. The scope of protection should be determined by the scope defined by the claims of the present disclosure.

In a typical configuration, a computing device includes one or more processors (CPUs), an input/output interface, a network interface, and memory.

The memory may include non-persistent memory, random access memory (RAM), and/or non-volatile memory in a computer readable medium, such as read-only memory (ROM) or flash memory. Memory is an example of the computer-readable medium.

Computer-readable media includes both persistent and non-persistent, removable and non-removable media, where information storage can be implemented by any method or technology. The information can be computer readable instructions, data structures, modules of program, or other data. Examples of computer storage media include, but are not limited to, phase change memory (PRAM), static random access memory (SRAM), dynamic random access memory (DRAM), other types of random access memory (RANI), read-only memory (ROM), electrically erasable programmable read only memory (EEPROM), flash memory or other memory technology, compact disk read-only memory (CD-ROM), digital versatile disk (DVD) or other optical storage, magnetic tape cartridges, magnetic tape storage, magnetic disk storage or other magnetic storage devices, or any other non-transmittable media can be used to store information that can be accessed by a computing device. The computer-readable media, as defined herein, does not include non-transitory computer readable media, such as modulated data signals and carrier waves.

Those skilled in the art would appreciate that example embodiments of the present disclosure can be provided as methods, systems, or computer program products. Thus, the present disclosure can take the form of an entire hardware example embodiment, an entire software example embodiment, or an example embodiment in a combination of software and hardware. Moreover, the disclosure can take the form of a computer program product embodied thereon one or more computer-readable storage media (including but not limited to disk storage, CD-ROM, optical storage, etc.) including computer-readable program code.

EXAMPLE CLAUSES

Clause 1. A method of upgrading encryption machine, comprising: determining, by a controller for managing upgrading of encryption machine, a first encryption machine to be upgraded; transferring, by the controller, data of the first encryption machine to a second encryption machine; and sending, by the controller, an upgrade command for instructing the first encryption machine to conduct upgrade, to the first encryption machine.

Clause 2. The method of clause 1 further comprising: receiving, by the controller, a result of upgrade operation returned by the first encryption machine.

Clause 3. The method of clause 1, wherein transferring by the controller the data of the first encryption machine to the second encryption machine comprises: sending, by the controller, a first data backup command for instructing the first encryption machine to conduct data backup, to the first encryption machine; receiving, by the controller, first data returned by the first encryption machine, the first data being backup data obtained by backing up the data of the first encryption machine; sending, by the controller, a first data import command for instructing the second encryption machine to import the first data, to the second encryption machine; and receiving, by the controller, an import result regarding the first data returned by the second encryption machine.

Clause 4. The method of clause 3, further comprising: storing, by the controller, the first data returned by the first encryption machine into a file storage device.

Clause 5. The method of clause 3, further comprising: sending, by the controller, a second data backup command for instructing the second encryption machine to conduct data backup, to the second encryption machine; and receiving, by the controller, second data returned by the second encryption machine, the second data being backup data obtained by backing up the data of the second encryption machine.

Clause 6. The method of clause 5, further comprising: storing, by the controller, the second data returned by the second encryption machine into the file storage device.

Clause 7. The method of clause 5, further comprising: sending, by the controller, a second data import command for instructing the first encryption machine to import the second data returned by the second encryption machine, to the first encryption machine; and receiving, by the controller, a second data import result returned by the first encryption machine.

Clause 8. The method of clause 3, further comprising: sending, by the controller, a migration command for instructing an SLB to migrate a service system request, to the SLB.

Clause 9. The method of clause 8 further comprising: receiving, by the controller, a migration result of the service system request returned by the SLB.

Clause 10. The method of 8, wherein sending by the controller the migration command for instructing the SLB to migrate the service system request to the SLB comprises: sending, by the controller, a command for instructing the SLB to migrate the service system request from the first encryption machine to the second encryption machine, to the SLB; or sending, by the controller, a command for instructing the SLB to migrate the service system request from the second encryption machine to the first encryption machine, to the SLB.

Clause 11. The method of clause 1 further comprising: storing, by the controller, an upgrade software package for upgrading the first encryption machine into a file storage device; and sending by the controller the upgrade command for instructing the first encryption machine to conduct upgrade to the first encryption machine including: sending, by the controller, an upgrade command for instructing the first encryption machine to obtain an upgrade software package in the file storage device and utilize the upgrade software package to conduct the upgrade, to the first encryption machine.

Clause 12. A method of upgrading encryption machine, comprising: receiving, by a first encryption machine, a first data backup command for instructing a first encryption machine to conduct data backup, the first data backup command being sent by a controller for managing upgrading of encryption machine, the first encryption machine being an encryption machine to be upgraded; returning, by the first encryption machine, exported first data to the controller, the first data being backup data obtained by backing up data of the first encryption machine; receiving, by the first encryption machine, an upgrade command for instructing the first encryption machine to conduct upgrade, the upgrade command being sent by the controller; and performing, by the first encryption machine, an upgrade operation according to the upgrade command.

Clause 13. The method of clause 12, further comprising: returning, by the first encryption machine, a result of upgrade operation to the controller.

Clause 14. The method of 13, wherein performing the upgrading operation comprises: sending, by the first encryption machine, a request for obtaining an upgrade software package to a file storage device storing the upgrade software package, wherein the upgrade software package is a software package for upgrading encryption machine; receiving, by the first encryption machine, the upgrade software package returned by the file storage device; and performing, by the first encryption machine, the upgrade operation according to the upgrade software package.

Clause 15. The method of clause 12, further comprising: receiving, by the first encryption machine, a second data import command sent by the controller, the second data import command being an import command for instructing the first encryption machine to import the second data of the second encryption machine; obtaining, by the first encryption machine, second data of the second encryption machine, the second data being backup data obtained by backing up data of the second encryption machine; and performing, by the first encryption machine, an import operation on the second data of the second encryption machine.

Clause 16. The method of 15, wherein obtaining by the first encryption machine the second data of the second encryption machine comprises: obtaining, by the first encryption machine, the second data of the second encryption machine from a file storage device storing the second data of the second encryption machine.

Clause 17. A method of data importing, comprising: receiving, by a second encryption machine, a first data import command for instructing the second encryption machine to import data of a first encryption machine, the first data import command being sent by a controller for managing upgrading of encryption machine; and performing, by the second encryption machine, an import operation on first data of the first encryption machine, the first encryption machine being an encryption machine to be upgraded, and the first data being backup data obtained by backing up the data of the first encryption machine.

Clause 18. The method of 17, wherein performing by the second encryption machine the import operation on the first data of the first encryption machine comprises: sending, by the second encryption machine, a request for obtaining the first data of the first encryption machine, to a file storage device storing the first data of the first encryption machine; receiving, by the second encryption machine, the first data of the first encryption machine returned by the file storage device; and performing, by the second encryption machine, an import operation on the first data of the first encryption machine.

Clause 19. The method of clause 17, further comprising: receiving, by the second encryption machine, a second data backup command for instructing the second encryption machine to conduct data backup, the second data backup command being sent by the controller; exporting, by the second encryption machine, second data according to the second data backup command, the second data being backup data obtained by backing up data of the second encryption machine; and returning, by the second encryption machine, exported second data to the controller.

Clause 20. A method of migrating a request of a service system, comprising: receiving, by an SLB (Server Load Balancer), a first network migration command sent by a controller for managing upgrading of encryption machine, the first network migration command being used to instruct that a request of a service system is migrated from a first encryption machine to a second encryption machine, the first encryption machine is an encryption machine to be upgraded; and migrating, by the SLB, the request of the service system from the first encryption machine to the second encryption machine according to the first network migration command.

Clause 21. The method of clause 20, further comprising: receiving, by the SLB, a second network migration command sent by the controller, the second network migration command being used to instruct that the request of the service system is migrated from the second encryption machine to the first encryption machine; and migrating the request of the service system from the second encryption machine to the first encryption machine according to the second network migration command.

Clause 22. An apparatus for upgrading encryption machine, comprising: a first encryption machine determining unit, configured to determine, by a controller for managing upgrading of encryption machine, a first encryption machine to be upgraded; a data transferring unit, configured to transfer, by the controller, data of the first encryption machine to a second encryption machine; and an upgrade command sending unit, configured to send, by the controller, an upgrade command for instructing the first encryption machine to conduct upgrade, to the first encryption machine.

Clause 23. An apparatus for upgrading encryption machine, comprising: a data backup command receiving unit, configured to receive, by a first encryption machine, a first data backup command for instructing the first encryption machine to conduct data backup, the first data backup command being sent by a controller for managing upgrading of encryption machine, the first encryption machine being an encryption machine to be upgraded; a data returning unit, configured to return, by the first encryption machine, exported first data to the controller, the first data being backup data obtained by backing up data of the first encryption machine; an upgrade command receiving unit, configured to receive, by the first encryption machine, an upgrade command for instructing the first encryption machine to conduct upgrade, the upgrade command being sent by the controller; and an upgrade operation executing unit, configured to perform, by the first encryption machine, an upgrade operation according to the upgrade command.

Clause 24. A data importing device, comprising: an import command receiving unit, configured to receive, by a second encryption machine, a first data import command for instructing the second encryption machine to import first data of a first encryption machine, the first data import command being sent by a controller for managing upgrading of encryption machine; and an import operation executing unit, configured to perform, by the second encryption machine, an import operation on the first data of the first encryption machine, the first encryption machine being an encryption machine to be upgraded, the first data being backup data obtained by backing up the data of the first encryption machine.

Clause 25. An apparatus for migrating a request of a service system, comprising: a migration command receiving unit, configured to receive, by an SLB, a first network migration command sent by a controller for managing upgrading of encryption machine, wherein the first network migration command is used to instruct that a request of a service system is migrated from a first encryption machine to a second encryption machine, the first encryption machine being an encryption machine to be upgraded; and a migration unit, configured to migrate, by the SLB, the request of the service system from the first encryption machine to the second encryption machine according to the first network migration command.

Clause 26. An electronic device, comprising: a processor; and memory, configured to store a program of a method of upgrading encryption machine, wherein after the device is powered on and runs the program of the method of upgrading the encryption machine by the processor, the following steps are performed: determining, by a controller for managing upgrading of encryption machine, a first encryption machine to be upgraded; transferring, by the controller, data of the first encryption machine to a second encryption machine; and sending, by the controller, an upgrade command for instructing the first encryption machine to conduct upgrade, to the first encryption machine.

Clause 27. An electronic device, comprising: a processor; and memory, configured to store a program of a method of upgrading encryption machine, wherein after the device is powered on and runs the program of the method of upgrading the encryption machine by the processor, the following steps are performed: receiving, by a first encryption machine, a first data backup command for instructing a first encryption machine to conduct data backup, the first data backup command being sent by a controller for managing upgrading of encryption machine, the first encryption machine being an encryption machine to be upgraded; returning, by the first encryption machine, exported first data to the controller, the first data being backup data obtained by backing up data of the first encryption machine; receiving, by the first encryption machine, an upgrade command for instructing the first encryption machine to conduct upgrade, the upgrade command being sent by the controller; and performing, by the first encryption machine, an upgrade operation according to the upgrade command.

Clause 28. An electronic device, comprising: a processor; and memory, configured to store a program of a method of importing upgrade data, wherein after the device is powered on and runs the program of the method of importing upgrade data by the processor, the following steps are performed: receiving, by a second encryption machine, a first data import command for instructing the second encryption machine to import data of a first encryption machine, the first data import command being sent by a controller for managing upgrading of encryption machine; performing, by the second encryption machine, an import operation on first data of the first encryption machine, the first encryption machine being an encryption machine to be upgraded, and the first data being backup data obtained by backing up the data of the first encryption machine.

Clause 29. An electronic device, comprising: a processor; and memory, configured to store a program of a method of migrating a request of a service system, wherein after the device is powered on and runs the program of the method of migrating the request of the service system by the processor, the following steps are performed: receiving, by an SLB, a first network migration command sent by a controller for managing upgrading of encryption machine, the first network migration command being used to instruct that a request of a service system is migrated from a first encryption machine to a second encryption machine, the first encryption machine is an encryption machine to be upgraded; and migrating, by the SLB, the request of the service system from the first encryption machine to the second encryption machine according to the first network migration command.

Clause 30. A storage device, comprising: a program storing a method of upgrading encryption machine, the program being executed by the processor, performing the following steps: determining, by a controller for managing upgrading of encryption machine, a first encryption machine to be upgraded; transferring, by the controller, data of the first encryption machine to a second encryption machine; and sending, by the controller, an upgrade command for instructing the first encryption machine to conduct upgrade, to the first encryption machine.

Clause 31. A storage device, comprising: a program storing a method of upgrading encryption machine, the program being executed by the processor, performing the following steps: receiving, by a first encryption machine, a first data backup command for instructing a first encryption machine to conduct data backup, the first data backup command being sent by a controller for managing upgrading of encryption machine, the first encryption machine being an encryption machine to be upgraded; returning, by the first encryption machine, exported first data to the controller, the first data being backup data obtained by backing up data of the first encryption machine; receiving, by the first encryption machine, an upgrade command for instructing the first encryption machine to conduct upgrade, the upgrade command being sent by the controller; and performing, by the first encryption machine, an upgrade operation according to the upgrade command.

Clause 32. A storage device, comprising: a second encryption machine, configured to receive a first data import command for instructing a second encryption machine to import data of a first encryption machine, the first data import command being sent by a controller for managing upgrading of encryption machine; wherein the second encryption machine performs an import operation on first data of the first encryption machine, the first encryption machine being an encryption machine to be upgraded, and the first data being backup data obtained by backing up the data of the first encryption machine.

Clause 33. A storage device, comprising: a program storing a method of migrating a request of a service system, the program being executed by a processor, performing the following steps: receiving, by an SLB, a first network migration command sent by a controller for managing upgrading of encryption machine, the first network migration command being used to instruct that a request of a service system is migrated from a first encryption machine to a second encryption machine, the first encryption machine being an encryption machine to be upgraded; and migrating, by the SLB, the request of the service system from the first encryption machine to the second encryption machine according to the first network migration command.

What is claimed is:

1. A method, comprising:
   determining, by a controller for managing upgrading of encryption machine, a first encryption machine to be upgraded;
   storing, by the controller, an upgrade software package for upgrading the first encryption machine into a file storage device;
   transferring, by the controller, data of the first encryption machine to a second encryption machine; and
   sending, by the controller, an upgrade command for instructing the first encryption machine to conduct upgrade, to the first encryption machine, wherein sending, by the controller, the upgrade command for instructing the first encryption machine to conduct upgrade, to the first encryption machine further comprises
      sending, by the controller, the upgrade command for instructing the first encryption machine to obtain the upgrade software package in the file storage device and
      utilize the upgrade software package to conduct the upgrade, to the first encryption machine, wherein the upgrade operation is executed by the first encryption machine according to the upgrade command.

2. The method of claim 1 further comprising:
   receiving, by the controller, a result of upgrade operation returned by the first encryption machine.

3. The method of claim 1, wherein transferring by the controller the data of the first encryption machine to the second encryption machine comprises:
   sending, by the controller, a first data backup command for instructing the first encryption machine to conduct data backup, to the first encryption machine;
   receiving, by the controller, first data returned by the first encryption machine, the first data being backup data obtained by backing up the data of the first encryption machine;
   sending, by the controller, a first data import command for instructing the second encryption machine to import the first data, to the second encryption machine; and
   receiving, by the controller, an import result regarding the first data returned by the second encryption machine.

4. The method of claim 3, further comprising:
   storing, by the controller, the first data returned by the first encryption machine into a file storage device.

5. The method of claim 3, further comprising:
   sending, by the controller, a second data backup command for instructing the second encryption machine to conduct data backup, to the second encryption machine; and
   receiving, by the controller, second data returned by the second encryption machine, the second data being backup data obtained by backing up the data of the second encryption machine.

6. The method of claim 5, further comprising:
   storing, by the controller, the second data returned by the second encryption machine into the file storage device.

7. The method of claim 5, further comprising:
   sending, by the controller, a second data import command for instructing the first encryption machine to import the second data returned by the second encryption machine, to the first encryption machine; and
   receiving, by the controller, a second data import result returned by the first encryption machine.

8. The method of claim 3, further comprising:
   sending, by the controller, a migration command for instructing an SLB (Server Load Balancer) to migrate a service system request, to the SLB.

9. The method of claim 8 further comprising:
   receiving, by the controller, a migration result of the service system request returned by the SLB.

10. The method of claim 8, wherein sending by the controller the migration command for instructing the SLB to migrate the service system request to the SLB comprises:
    sending, by the controller, a command for instructing the SLB to migrate the service system request from the first encryption machine to the second encryption machine, to the SLB; or
    sending, by the controller, a command for instructing the SLB to migrate the service system request from the second encryption machine to the first encryption machine, to the SLB.

11. A computer-readable storage medium storing computer-readable instructions executable by one or more processors, that when executed by the one or more processors, causes the one or more processors to perform acts comprising:
    receiving, by a first encryption machine, a first data backup command for instructing a first encryption machine to conduct data backup, the first data backup command being sent by a controller for managing upgrading of encryption machine, the first encryption machine being an encryption machine to be upgraded;
    returning, by the first encryption machine, exported first data to the controller, the first data being backup data obtained by backing up data of the first encryption machine;

receiving, by the first encryption machine, an upgrade command for instructing the first encryption machine to conduct upgrade, the upgrade command being sent by the controller, wherein the controller stores an upgrade software package for upgrading the first encryption machine into a file storage device; and performing, by the first encryption machine, an upgrade operation according to the upgrade command, wherein performing the upgrading operation comprises:

sending, by the first encryption machine, a request for obtaining the upgrade software package to the file storage device storing the upgrade software package;

receiving, by the first encryption machine, the upgrade software package returned by the file storage device; and performing, by the first encryption machine, the upgrade operation according to the upgrade software package.

12. The computer-readable storage medium of claim 11, the acts further comprising:

returning, by the first encryption machine, a result of upgrade operation to the controller.

13. The computer-readable storage medium of claim 12, wherein performing the upgrading operation comprises:

sending, by the first encryption machine, a request for obtaining the upgrade software package to the file storage device storing the upgrade software package;

receiving, by the first encryption machine, the upgrade software package returned by the file storage device; and performing, by the first encryption machine, the upgrade operation according to the upgrade software package.

14. The computer-readable storage medium of claim 11, the acts further comprising:

receiving, by the first encryption machine, a second data import command sent by the controller, the second data import command being an import command for instructing the first encryption machine to import the second data of the second encryption machine;

obtaining, by the first encryption machine, second data of the second encryption machine, the second data being backup data obtained by backing up data of the second encryption machine; and performing, by the first encryption machine, an import operation on the second data of the second encryption machine.

15. The computer-readable storage medium of claim 14, wherein obtaining by the first encryption machine the second data of the second encryption machine comprises:

obtaining, by the first encryption machine, the second data of the second encryption machine from a file storage device storing the second data of the second encryption machine.

16. An apparatus, comprising:
one or more processors; and
a memory, coupled to the one or more processors, the memory storing thereon computer-executable units, executable by the one or more processors, the executable units including:

an import command receiving unit, configured to receive, by a second encryption machine, a first data import command for instructing the second encryption machine to import first data of a first encryption machine, the first data import command being sent by a controller for managing upgrading of encryption machine, wherein the controller stores an upgrade software package for upgrading the first encryption machine into a file storage device, and sends an upgrade command for instructing the first encryption machine to obtain the upgrade software package in the file storage device and utilize the upgrade software package to conduct the upgrade, and wherein the first encryption executes an upgrade operation according to the upgrade command; and an import operation executing unit, configured to perform, by the second encryption machine, an import operation on the first data of the first encryption machine, the first encryption machine being an encryption machine to be upgraded, the first data being backup data obtained by backing up the data of the first encryption machine.

17. The apparatus of claim 16, wherein the import operation executing unit is further configured to:

send, by the second encryption machine, a request for obtaining the first data of the first encryption machine, to the file storage device storing the first data of the first encryption machine;

receive, by the second encryption machine, the first data of the first encryption machine returned by the file storage device; and perform, by the second encryption machine, an import operation on the first data of the first encryption machine.

18. The apparatus of claim 16, further comprising:
a second data backup command receiving unit, configured to receive, by the second encryption machine, a second data backup command for instructing the second encryption machine to conduct data backup, wherein the second data backup command is sent by the controller; and a data backup and export unit, configured to export, by the second encryption machine, the second data according to the second data backup command.

19. The apparatus of claim 16, further comprising:
a data backup returning unit, configured to return, by the second encryption machine, exported second data to the controller.

* * * * *